United States Patent [19]
Pechanek et al.

[11] Patent Number: 5,243,688
[45] Date of Patent: Sep. 7, 1993

[54] VIRTUAL NEUROCOMPUTER ARCHITECTURES FOR NEURAL NETWORKS

[75] Inventors: Gerald G. Pechanek, Endwell; Stamatis Vassiliadis; Jose G. Delgado-Frias, both of Vestal, all of N.Y.

[73] Assignee: International Business Machines Corporation, Armonk, N.Y.

[21] Appl. No.: 702,260

[22] Filed: May 17, 1991

Related U.S. Application Data

[63] Continuation-in-part of Ser. No. 526,866, May 22, 1990, Pat. No. 5,065,339, and a continuation-in-part of Ser. No. 682,786, Apr. 8, 1991, and a continuation-in-part of Ser. No. 681,842, Apr. 8, 1991.

[51] Int. Cl.$^5$ .............................................. G06F 15/18
[52] U.S. Cl. ........................................................ 395/27
[58] Field of Search ...................................... 395/27, 24

[56] References Cited
PUBLICATIONS

A General Purpose Digital Architecture for Neural Network Simulations; Duranton et al.; First IEE International Conference on Artificial Neural Networks; Oct. 16–18, 1989; pp. 62–66.

Design of Parallel Hardward Neural Network Systems ... Eberhardt et al; IJCNN; vol. 2 Jun. 18–22, 1989 pp. II-183-190.

Implementing Neural Nets with Programmable Logic; Vidal IEEE Trans. on Acoustics ... vol. 36 No. 7, Jul. 1988 pp. 1180-1190.

*Primary Examiner*—Allen R. MacDonald
*Attorney, Agent, or Firm*—Lynn L. Augspurger; Eugene I. Shkurko

[57] ABSTRACT

The architectures for a scalable neural processor (SNAP) and a Triangular Scalable Neural Array Processor (T-SNAP) are expanded to handle network simulations where the number of neurons to be modeled exceeds the number of physical neurons implemented. This virtual neural processing is described for three general virtual architectural approaches for handling the virtual neurons, one for SNAP and one for TSNAP, and a third approach applied to both SNAP and TSNAP.

18 Claims, 29 Drawing Sheets

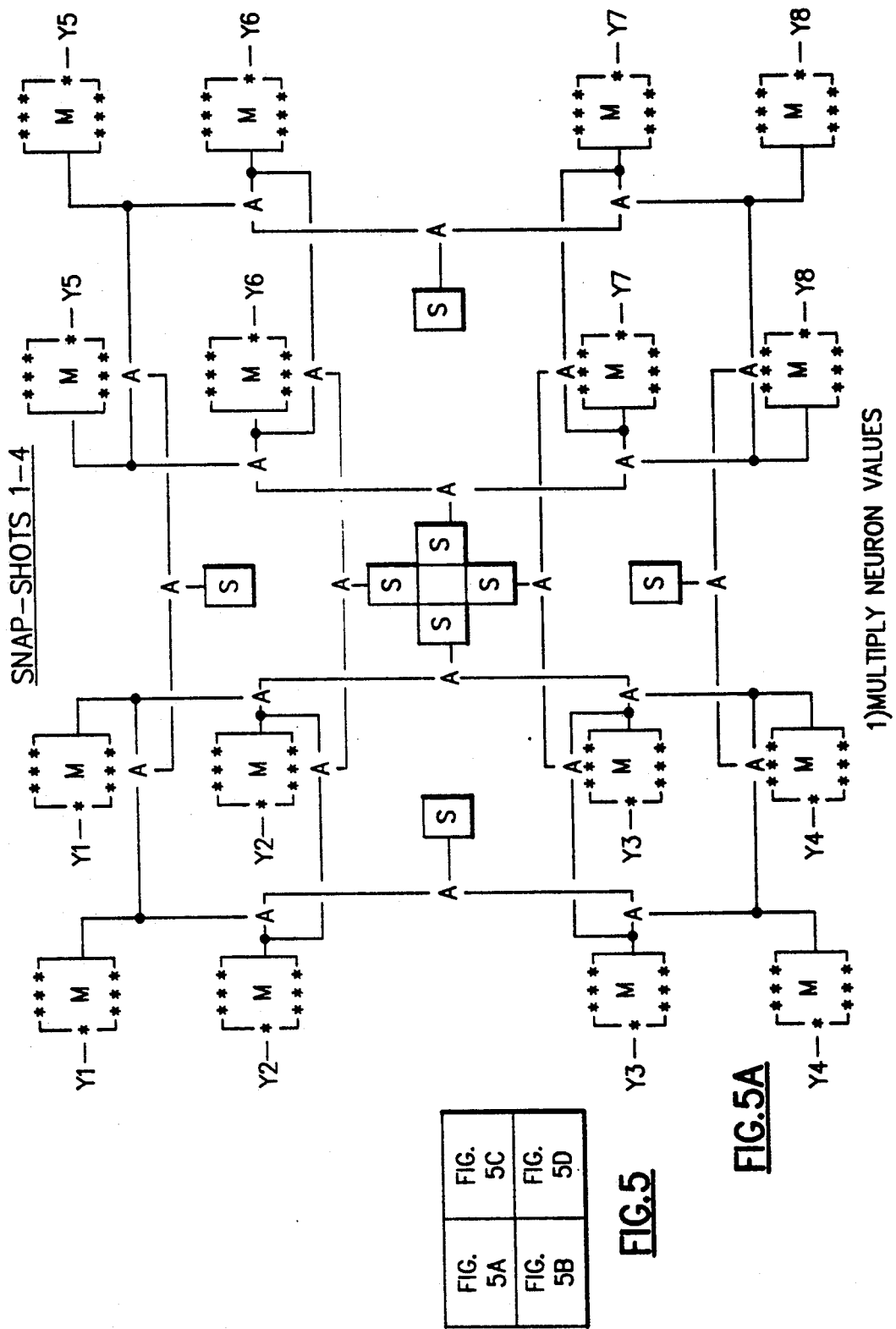

2) PARTIAL SUMMATION FORWARD

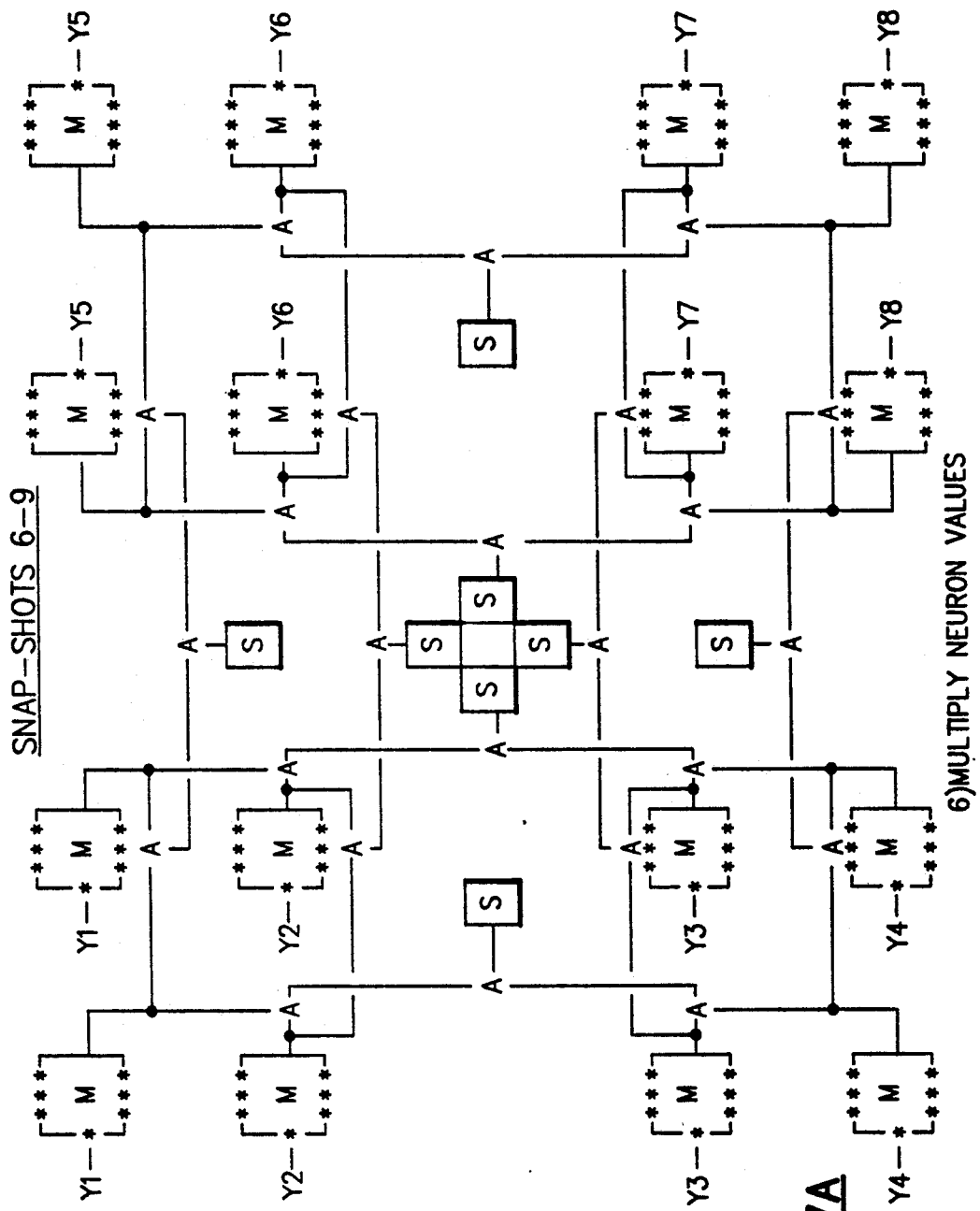

8) PARTIAL SUMMATION REVERSE & FINAL SUMMATION

7) PARTIAL SUMMATION FORWARD

9) GENERATE NEURON VALUES Y3' AND Y4'

4-NEURON T-SNAP

8-NEURON TSNAP WEIGHT MATRIX WITH NEURON Y VALUES

W11*Y1

W12*Y2
W21*Y1  W22*Y2

W13*Y3  W23*Y3
W31*Y1  W32*Y2  W33*Y3

W14*Y4  W24*Y4  W34*Y4
W41*Y1  W42*Y2  W43*Y3  W44*Y4

W15*Y5  W25*Y5  W35*Y5  W45*Y5
W51*Y1  W52*Y2  W53*Y3  W54*Y4  W55*Y5

W16*Y6  W26*Y6  W36*Y6  W46*Y6  W56*Y6
W61*Y1  W62*Y2  W63*Y3  W64*Y4  W65*Y5  W66*Y6

W17*Y7  W27*Y7  W37*Y7  W47*Y7  W57*Y7  W67*Y7
W71*Y1  W72*Y2  W73*Y3  W74*Y4  W75*Y5  W76*Y6  W77*Y7

W18*Y8  W28*Y8  W38*Y8  W48*Y8  W58*Y8  W68*Y8  W78*Y8
W81*Y1  W82*Y2  W83*Y3  W84*Y4  W85*Y5  W86*Y6  W87*Y7  W88*Y8

8-NEURON VIRTUAL TSNAP-V1 WITH 4 PHYSICAL NEURONS
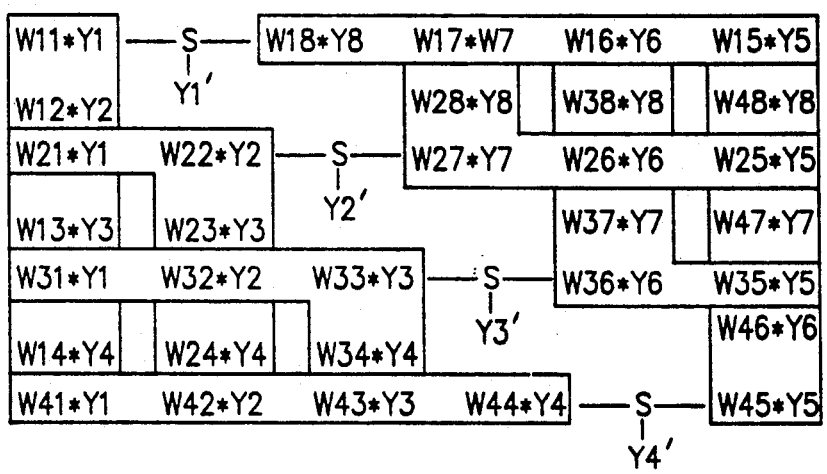
STEP 1
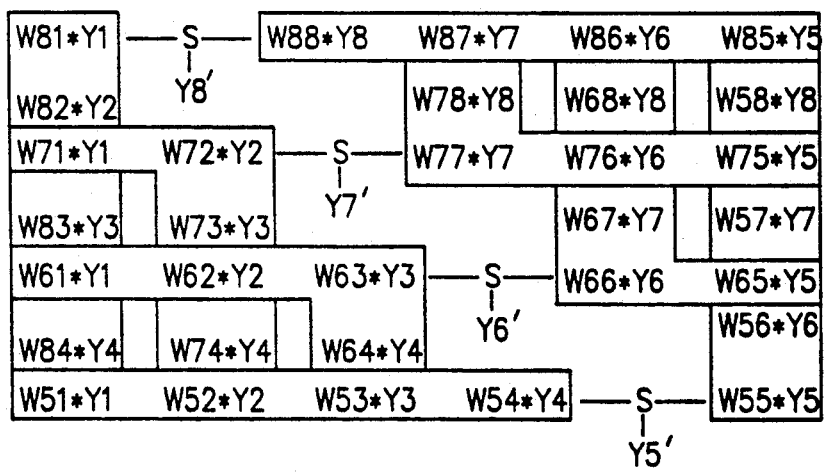
STEP 2
FIG.12

W11,11*Y11

W11,12*Y12
W12,11*Y11  W12,12*Y12

W11,13*Y13  W12,13*Y13
W13,11*Y11  W13,12*Y12  W13,13*Y13

W11,14*Y14  W12,14*Y14  W13,14*Y14
W14,11*Y11  W14,12*Y12  W14,13*Y13  W14,14*Y14

W11,15*Y15  W12,15*Y15  W13,15*Y15  W14,15*Y15
W15,11*Y11  W15,12*Y12  W15,13*Y13  W15,14*Y14  W15,15*Y15

W11,16*Y16  W12,16*Y16  W13,16*Y16  W14,16*Y16  W15,16*Y16
W16,11*Y11  W16,12*Y12  W16,13*Y13  W16,14*Y14  W16,15*Y15  W16,16*Y16

16-NEURON TSNAP WEIGHT MATRIX WITH NEURON Y VALUES

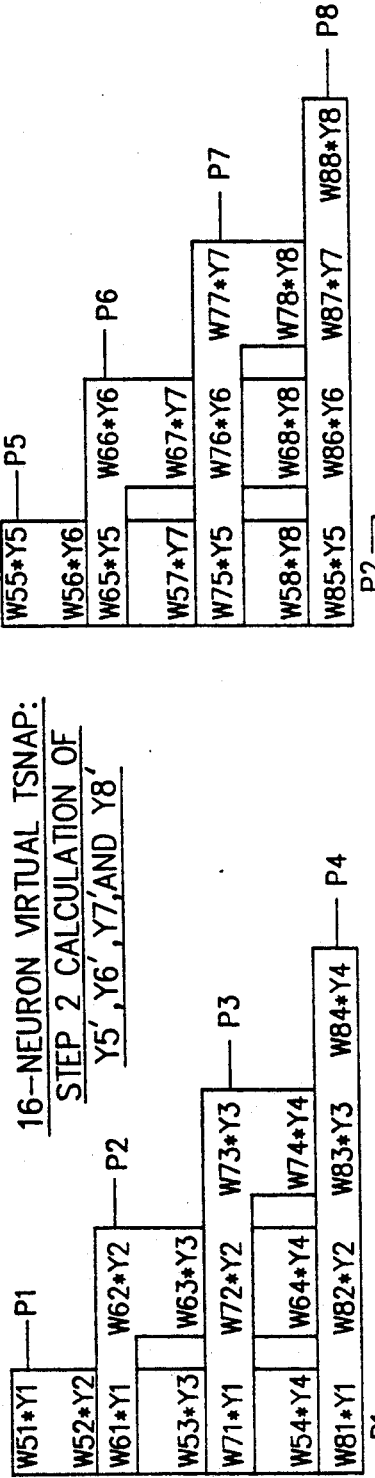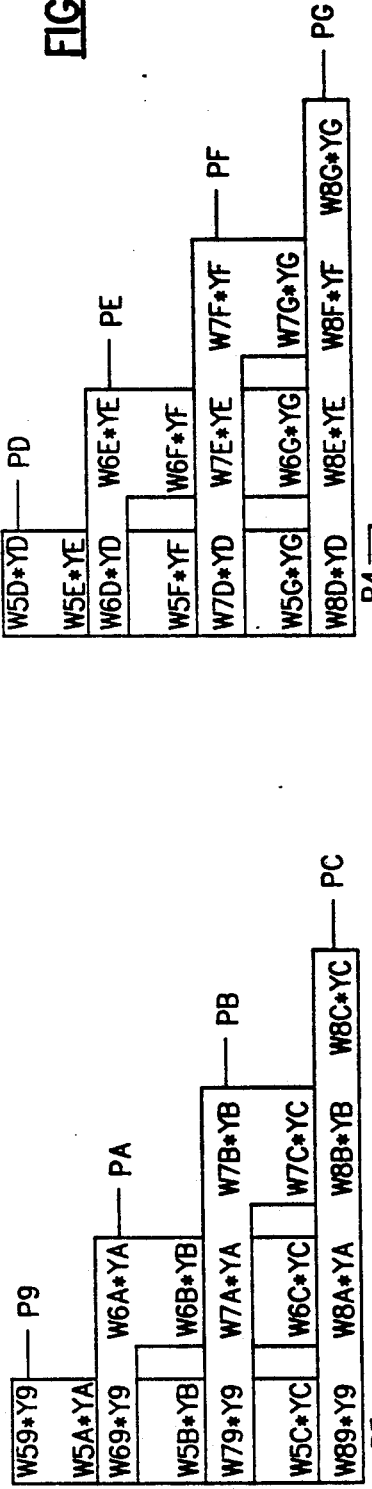
FIG.15

4-NEURON TSNAP-V2 WITH 16 NEURON WEIGHTS

FIG.18A

| W11 | W51 | W91 | WD1 | *Y1 |
|-----|-----|-----|-----|-----|
| W15 | W55 | W95 | WD5 | *Y5 |
| W19 | W59 | W99 | WD9 | *Y9 |
| W1D | W5D | W9D | WDD | *YD |

| W12 | W52 | W92 | WD2 | *Y2 |
|-----|-----|-----|-----|-----|
| W16 | W56 | W96 | WD6 | *Y6 |
| W1A | W5A | W9A | WDA | *YA |
| W1E | W5E | W9E | WDE | *YE |

| W21 | W61 | WA1 | WE1 | *Y1 |
|-----|-----|-----|-----|-----|
| W25 | W65 | WA5 | WE5 | *Y5 |
| W29 | W69 | WA9 | WE9 | *Y9 |
| W2D | W6D | WAD | WED | *YD |

| W22 | W62 | WA2 | WE2 | *Y2 |
|-----|-----|-----|-----|-----|
| W26 | W66 | WA6 | WE6 | *Y6 |
| W2A | W6A | WAA | WEA | *YA |
| W2E | W6E | WAE | WEE | *YE |

| W13 | W53 | W93 | WD3 | *Y3 |
|-----|-----|-----|-----|-----|
| W17 | W57 | W97 | WD7 | *Y7 |
| W1B | W5B | W9B | WDB | *YB |
| W1F | W5F | W9F | WDF | *YF |

| W23 | W63 | WA3 | WE3 | *Y3 |
|-----|-----|-----|-----|-----|
| W27 | W67 | WA7 | WE7 | *Y7 |
| W2B | W6B | WAB | WEB | *YB |
| W2F | W6F | WAF | WEF | *YF |

| W31 | W71 | WB1 | WF1 | *Y1 |
|-----|-----|-----|-----|-----|
| W35 | W75 | WB5 | WF5 | *Y5 |
| W39 | W79 | WB9 | WF9 | *Y9 |
| W3D | W7D | WBD | WFD | *YD |

| W32 | W72 | WB2 | WF2 | *Y2 |
|-----|-----|-----|-----|-----|
| W36 | W76 | WB6 | WF6 | *Y6 |
| W3A | W7A | WBA | WFA | *YA |
| W3E | W7E | WBE | WFE | *YE |

| W14 | W54 | W94 | WD4 | *Y4 |
|-----|-----|-----|-----|-----|
| W18 | W58 | W98 | WD8 | *Y8 |
| W1C | W5C | W9C | WDC | *YC |
| W1G | W5G | W9G | WDG | *YG |

| W24 | W64 | WA4 | WE4 | *Y4 |
|-----|-----|-----|-----|-----|
| W28 | W68 | WA8 | WE8 | *Y8 |
| W2C | W6C | WAC | WEC | *YC |
| W2G | W6G | WAG | WEG | *YG |

| W41 | W81 | WC1 | WG1 | *Y1 |
|-----|-----|-----|-----|-----|
| W45 | W85 | WC5 | WG5 | *Y5 |
| W49 | W89 | WC9 | WG9 | *Y9 |
| W4D | W8D | WCD | WGD | *YD |

| W42 | W82 | WC2 | WG2 | *Y2 |
|-----|-----|-----|-----|-----|
| W46 | W86 | WC6 | WG6 | *Y6 |
| W4A | W8A | WCA | WGA | *YA |
| W4E | W8E | WCE | WGE | *YE |

IA → S → Y1′,Y5′,Y9′,YD′

IA → S → Y2′,Y6′,YA′,YE′

VIRTUAL ARCHITECTURE COMPARISON SUMMARY

| NETWORK | VIR-TUAL SIZE | CELL STORAGE | | HARDWARE EXECUTION UNITS | | | PERFORMANCE DELAY EQUATION |
|---|---|---|---|---|---|---|---|
| | | WTS | Yjs | MPYs | ADDERS | SIGMOID | |
| SNAP | — | 2 | 2 | N*N | 2N(N−1) | 2*N | $\delta_M + 2(\log_2 N)\delta_A + \delta_S$ |
| TSNAP | — | 1 | 1 | N*N | N(N−1) | N | $\delta_M + 2(\log_2 N)\delta_A + \delta_S$ |
| SNAP-V1 | V | VK/N | 2 | N*N | 2N(N−1) | N | $\frac{(VK)}{N}(\delta_M + 4(\log_2 N)\delta_A + \delta_S)$ |
| SNAP-V2 | V | K*N | 2*K | N*N | 2N(N−1)+2N IAs | 2*N | $K(K\delta_M + (K+1)(\log_2 N)\delta_A + \delta_{IA} + \delta_S)$ |
| TSNAP-V1 | V | K | 1 | K*N*N | KN(N−1) | N | $K(\delta_M + 2(\log_2 N + \log_2 K)\delta_A + \delta_S)$ |
| TSNAP-V2 | V | K*K | K | N*N | N(N−1)+N IAs | N | $K(K\delta_M + 2(\log_2 N\delta_A + \delta_{IA}) + \delta_S)$ |

FIG.19

VIRTUAL NEUROCOMPUTER ARCHITECTURES FOR NEURAL NETWORKS

CROSS REFERENCE TO RELATED APPLICATIONS

The present application claims priority and is a continuation-in-part of the following related co-pending Patent Applications: APPARATUS AND METHOD FOR NEURAL PROCESSOR, S. Vassiliadis, and G. G. Pechanek, U.S. Ser. No. 07/526,866, filed May 18, 1990, now U.S. Pat. No. 5,065,339, sometimes referred to as "SNAP"; A TRIANGULAR SCALABLE NEURAL ARRAY PROCESSOR, G. G. Pechanek, and S. Vassiliadis, U.S. Ser. No. 07/682,786, filed Apr. 8, 1991 sometimes referred to as "T-SNAP"; SPIN: A SEQUENTIAL PIPELINED NEUROCOMPUTER, S. Vassiliadis, G. G. Pechanek, and J. G. Delgado-Frias, U.S. Ser. No. 07/681,842, filed Apr. 8, 1991, sometimes referred to as "SPIN".

FIELD OF THE INVENTION

These inventions relate to computers and computer systems and particularly to virtual neurocomputer architectures for neural networks.

In addition, filed concurrently herewith are related applications:

A LEARNING MACHINE SYNAPSE PROCESSOR SYSTEM APPARATUS, G. G. Pechanek, S. Vassiliadis, and J. G. Delgado-Frias, U.S. Ser. No. 07/702,261, filed May 17, 1991, sometimes referred to as "LEARNING MACHINE"

SCALABLE FLOW VIRTUAL LEARNING NEUROCOMPUTER, G. G. Pechanek, S. Vassiliadis, and J. G. Delgado-Frias, U.S. Ser. No. 07/702,262, filed May 17, 1991, sometimes referred to as "FLOW"

PLAN: PYRAMID LEARNING ARCHITECTURE NEUROCOMPUTER, G. G. Pechanek, S. Vassiliadis, and J. G. Delgado-Frias, U.S. Ser. No. 07/702,263, filed May 17, 1991, sometimes referred to as "PLAN".

These co-pending applications and the present application are owned by one and the same assignee, namely, International Business Machines Corporation of Armonk, N.Y.

The descriptions set forth in these co-pending applications are hereby incorporated into the present application by this reference.

REFERENCES USED IN THE DISCUSSION OF THE INVENTIONS

During the detailed discussion of our inventions we will reference other work including our own unpublished works which are not Prior Art, which will aid the reader in following our discussion. These additional references are:

R. Hecht-Neilsen, Neurocomputing Addison Wesley Publishing Company, pp. 297-315, 1990. (Herein referred to as "Hecht 90".)

R. T. Savely, Editor, "The implementation of Neural Network Technology," *IEEE First International Conference on Neural Networks*, pp. IV-477-484, IEEE, June 1987. (Herein referred to as "Savely,b IEEE 1987".)

P. Treleavin, M. Pacheco, and M. Vellasco, "VLSI Architectures for Neural Networks," *IEEE Micro*, pp. 8-27, December 1989. (Herein referred to as "Treleavin 89".)

S. Souc'ek and M. Souc'ek, *NEURAL and Massively Parallel Computers: The Sixth Generation* New York, N.Y.: John Wiley & Sons, 1988. (Herein referred to as "Souc'ek 88".)

D. E. Rumelhart, J. L. McClelland, and the PDP Research Group, *Parallel Distributed Processing Vol. 1:Foundations* Cambridge, Mass.: MIT Press 1986. (Herein referred to as "Rumelhart 86".)

J. J. Hopfield, "Neurons With Graded Response Have Collective Computational Properties Like Those of Two-State Neurons," *Proceedings of the National Academy of Sciences* 81, pp. 3088-3092, May, 1984. (Herein referred to as "Hopfield 84".)

APPARATUS AND METHOD FOR NEURAL PROCESSOR, S. Vassiliadis, and G. G. Pechanek, U.S. Ser. No. 07/526,866, filed May 18, 1990, herein sometimes referred to as "SNAP" or "Vassiliadis SNAP 90".

A TRIANGULAR SCALABLE NEURAL ARRAY PROCESSOR, G. G. Pechanek, and S. Vassiliadis, U.S. Ser. No. 07/682,785, filed Apr. 8, 1991 herein sometimes referred to as "T-SNAP" or "Pechanek T-SNAP 91".

These additional references are incorporated by reference.

BACKGROUND OF THE INVENTION

Introduction

The neurons modeled on the neural processor are simulated in either a "direct" or a "virtual" implementation. In a direct method, each neuron would have a physical processing element (PE) available which could operate simultaneously in parallel with the other neuron PE's active in the system. In a "virtual" implementation, multiple neurons are assigned to individual hardware processing elements (PEs), requiring that the PE's processing be shared across its "virtual" neurons. The performance of the network will be greater under the "direct" approach, but due to the large number of neurons utilized in many network simulations and technology constraints limiting the number of "direct" neuron PEs which can be implemented, many neurocomputer designs utilize the "virtual" neurons concept to simulate more neurons than are available directly.

The basic concept involved in a virtual neurocomputer is to provide some degree of parallelism, if possible, and then to divide the total number of neurons to be implemented in a network among the parallel processing elements available and to use time division multiplexing per physical processing element. This naturally spreads a single time unit out to cover the processing required for the number of virtual neural nodes assigned to a single physical PE. A virtual neural node represents one neuron in the network being simulated. A uniprocessor can be used but it must handle all processing for all neural nodes in a sequential manner. Because of this, many virtual neurocomputers use a parallel arrangement of microprocessors. Parallel arrangements for neurocomputing may be reviewed. See Hecht-Nielsen 90; Savely IEEE 87., and Treleaven 89. The structure used usually allows for floating point hardware accelerators to be added for improved performance of each neural node calculation. An efficient communications network between the physical PE's is also required among the parallel processing elements to improve performance. For these virtual neurocomputers to function, there must be local memory for the physical processors containing the network interconnection structure, weight matrix, and virtual PE activation state memory. There must also be an interface to a host computer, which can be as simple as a personal computer depending upon the requirements to initialize the network, supply input patterns or data, and retrieve and analyze the output patterns or data.

SUMMARY OF OUR INVENTIONS

Generally, our virtual system is scalable and applicable to networks and permits our improved hardware, illustrated in other applications, to be used where the physical hardware does not have enough neurons to achieve the results of the desired application. The new apparatus which acts as a virtual scalable neural array processor apparatus has an N neuron structure having weight multiplication units containing a multiplier, weight storage, and neuron output value storage for V neurons where V>N and V is the number of neurons in the neural network to be emulated on the N neuron structure. We also provide communicating adder trees, neuron activation function units and a way to communicate the outputs of the neuron activation function units back to the input weight multiplication units by way of the communicating adder trees.

The first architectural preferred embodiment is the approach to be discussed. It modifies the SNAP structure to allow the sharing of the physical synapse processing elements such that a neuron input is not represented by a column or row of N synapse processors but by multiple rows or columns of synapse processors. A second architectural preferred embodiment to be discussed is the approach for TSNAP which replicates groups of synapse processing elements until sufficient synapse processing elements are available to cover the V neurons to be modeled while keeping N activation function generators (sigmoid generators). A third architectural preferred embodiment to be discussed is the general approach, representing a common approach for either SNAP or TSNAP, which adds an iterative adder with a partial summation storage element to each of the inputs of the N sigmoid generators and increases the weight storage appropriately at each synapse processor.

These and other improvements, illustrating all three architectural approaches, are set forth in the following detailed description. For a better understanding of the inventions, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS

FIGS. 5, 5A, 5B, 5C, and 5D show SNAP-shots 1-4.
FIGS. 7, 7A, 7B, 7C, and 7D show SNAP-shots 6 through 9.

FIGS. 9, 9A, 9B, and 9C illustrate SNAP-V2 with eight Virtual Neurons.
FIG. 12 shows an eight Neuron Virtual T-SNAP with 4 physical Neurons.
FIGS. 13, 13A, 13B, and 13C shows a 16-Neuron T-SNAP weight matrix with Neuron Y values.
FIG. 15 shows a 16-Neuron Virtual T-SNAP, and the Step 2 calculation of Y5', Y6', Y7', and Y8'.
FIGS. 18, 18A, and 18B show a 4-Neuron TSNAP-V2 with 16 Neuron weights, while
FIG. 19 shows a Virtual Architecture Comparison Summary.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

Our detailed description follows as parts explaining our preferred embodiments of our inventions provided by way of example.

DETAILED DESCRIPTION OF THE INVENTION

Before considering our preferred embodiments in detail, it may be worthwhile to illustrate, by way of example, a virtual neurocomputer which we envision as useful for further understanding the virtual neurocomputer architectures which we have invented for neural networks which enable hardware to be expanded beyond its hardware limits to handle applications which would require more neurons than there are available.

Figure 1:
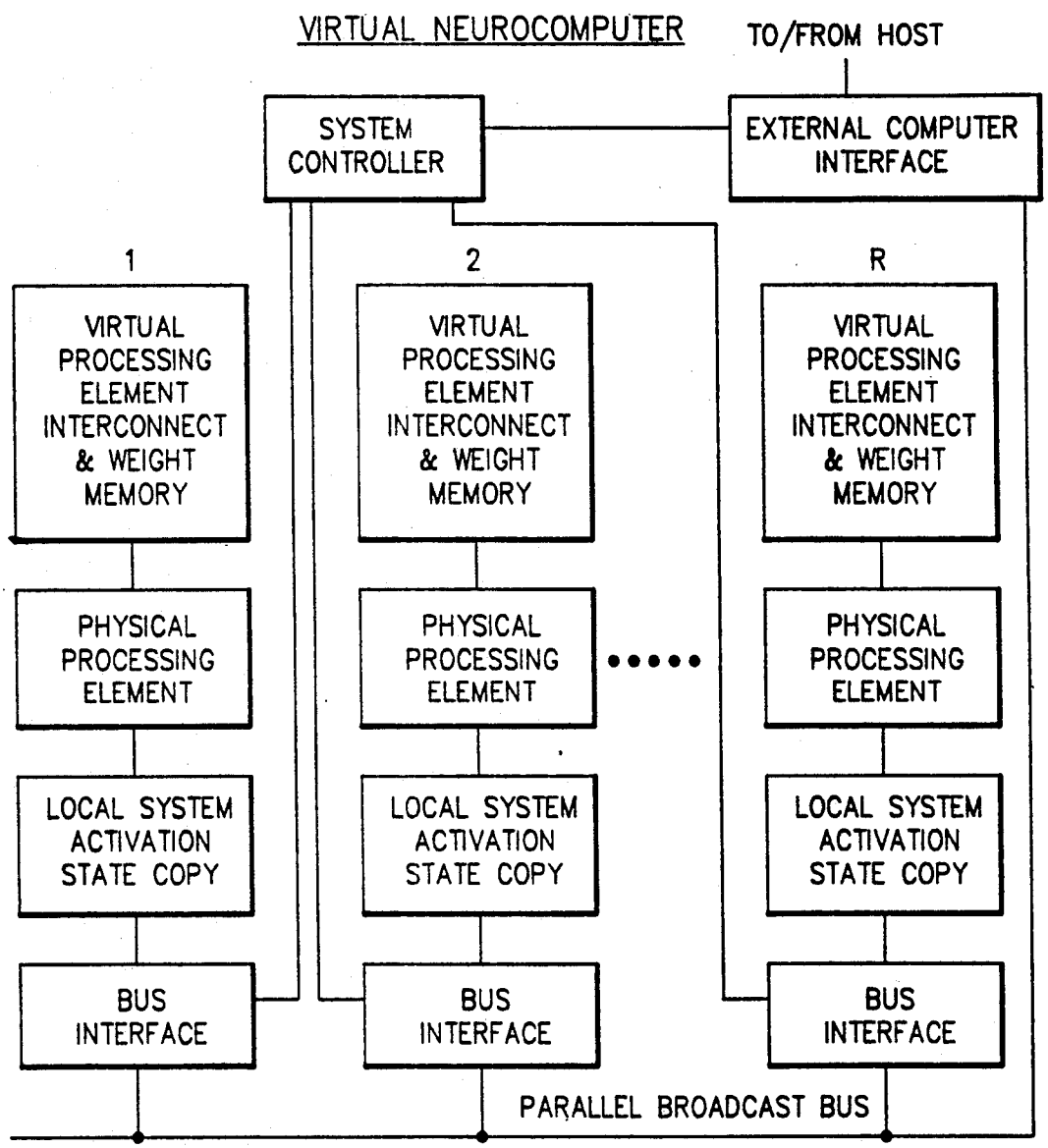
FIG. 1 illustrates the Virtual Neurocomputer.

The characteristics of a virtual neurocomputer are shown in FIG. 1. Reference here may be had to a related system from Hecht-Nielsen illustrated by Sou'cek 88. There are up to R physical processing elements depicted in FIG. 1. For a neural network of K×R neurons, each physical processor would be assigned the neural node calculation task for K neurons. This task is the calculation of the sum of products (weight x connected neuron output), the activation function, and possibly an output function. The parallel broadcast bus is used to communicate network interconnection information, neuron activation state values, etc. between the physical processors. In the structure of FIG. 1, the parallel bus is controlled by the system controller to ensure no bus conflicts. After the virtual neuron activation output values are calculated, the local system copies for these values must be updated in each neural processing element.

For the purposes of illustrating our preferred embodiments and the architectures illustrated by the embodiments, the number V will be used to denote the number of neurons contained in the network to be modeled on the neurocomputer; the number N will denote the number physical neurons available in the physical implementation. For virtual processing V>N. Unless otherwise indicated, N and V are powers of 2. The computational tasks to be implemented by the neurocomputer architectures described herein are given by equation 1 and 2 which are based on a subset of the full Parallel Distributed Processing model. See here Rumelhart 86 and the Hopfield network illustrated by Hopfield 84.

$$Y_i = F\left(\sum_{j=1}^{V} Y_j W_{ij}\right) \quad (1)$$

Where:
V is the number of neurons in the neural network.
The subscripts on the weights W such as $W_{13}$ is to be interpreted as meaning the weight of the connection from Neuron 3 to Neuron 1.
$Y_j$ is the $j^{th}$ neuron output value connected to the $i^{th}$ neuron input through a connection weight of $W_{ij}$.
F(z) is the neuron activation function which many times is set equal to a sigmoid activation function whose form, for example is:

$$F(z) = \frac{1}{1 + e^{-\frac{2z}{T}}} \quad (2)$$

Where:
For the function $$F(z)z = \sum_{i=1}^{V} Y_i W_{ij}$$

$0 \leq F(z) \leq 1$
T is a global control parameter used to modify the slope of the sigmoid function for a given set of z values.
e=Natural log (2.71828...)
Equations 1 and 2, for a completely connected V neuron network, contain four basic operations:
1. $V^2$ Multiplications
2. V Product Summations
3. V Activation Functions
4. V×V communications In accordance with our preferred embodiments, generally, the HOST computer assumes the responsibilities of initializing the network architectures. For example, the HOST computer will be responsible for the loading of the number of neurons in the network to be simulated by the architecture, all the connection weights, the initial neuron values, the number of network update cycles to be run, as well as starting the model into execution. The HOST computer is also provided with the ability to read the neuron values at the completion of network execution. In assessing and comparing the performance of the various neural processing architectures the initialization time and the Host processing time are considered as a separate issue. Only the performance during execution will be considered.

The first architectural preferred embodiment is the approach to be discussed. It modifies the SNAP structure (see Vassiliadis SNAP 90) to allow the sharing of the physical synapse processing elements such that a neuron input is not represented by a column or row of N synapse processors but rather by multiple rows or columns of synapse processors. A second architectural preferred embodiment to be discussed is the approach for TSNAP (see Pechanek T-SNAP) which replicates groups of synapse processing elements until sufficient synapse processing elements are available to cover the V neurons to be modeled while keeping N activation function generators (sigmoid generators). A third architectural preferred embodiment to be discussed is the general approach, representing a common approach for either SNAP or TSNAP, which adds an iterative adder with a partial summation storage element to each of the inputs of the N sigmoid generators and increases the weight storage appropriately at each synapse processor. After each architectural approach is reviewed, the performance of each virtual neurocomputer is discussed. A summary compares each virtual architecture approach in terms of implementation costs and performance. The "best" architecture for a given application will depend upon these costs and will be chosen for the particular application.

PERFORMANCE INTRODUCTION

To evaluate the performance of the virtual architectures, assume that the delay variables are denoted by $\delta_{name}$ which represents the delay through the "named" element. The following delay variables are used:
$\delta_M$=Multiplier delay.
$\delta_A$=Communicating Adder: 2-1 add stage delay
$\delta_S$=Sigmoid generator delay
$\delta_B$=Communicating Adder: communications bypass stage delay The following general assumptions and other notation will be noted:
1. The system defined clock period is C, with all delays specified as multiples of C.
2. The number of stages in the communicating adder tree is $\log_2 N$, where N is the total number of physical neurons.

The performance of the architectures will be represented by the period of generating the neuron outputs. In order to achieve safety with no additional delays, each operation must follow in sequence at the completion of the previous operation, as follows:
1. multiply,
2. add tree,
3. sigmoid generator,
4. communication tree This sequence of events requires a simple control mechanism such as the use of a counter whose output value is compared against delay values representing the listed events, namely: the multiplier delay, the $\log_2 N$ communicating adder tree-add mode delay, the sigmoid delay, and the $\log_2 N$ communicating adder tree-communications mode delay.

SNAP-V1: SNAP VIRTUAL ARCHITECTURE 1

The first approach to be described, termed SNAP-V1, restricts V to a maximum of $N^2$. Greater than $N^2$ neurons can be simulated with this architecture but a more involved control process would be required and this expanded capability will not be discussed in this description. For the SNAP-V1 architecture, the SNAP neuron definition (Vassiliadis SNAP 90) is changed to accommodate the greater number of weighted inputs required per neuron.

Figures 2, 2B:
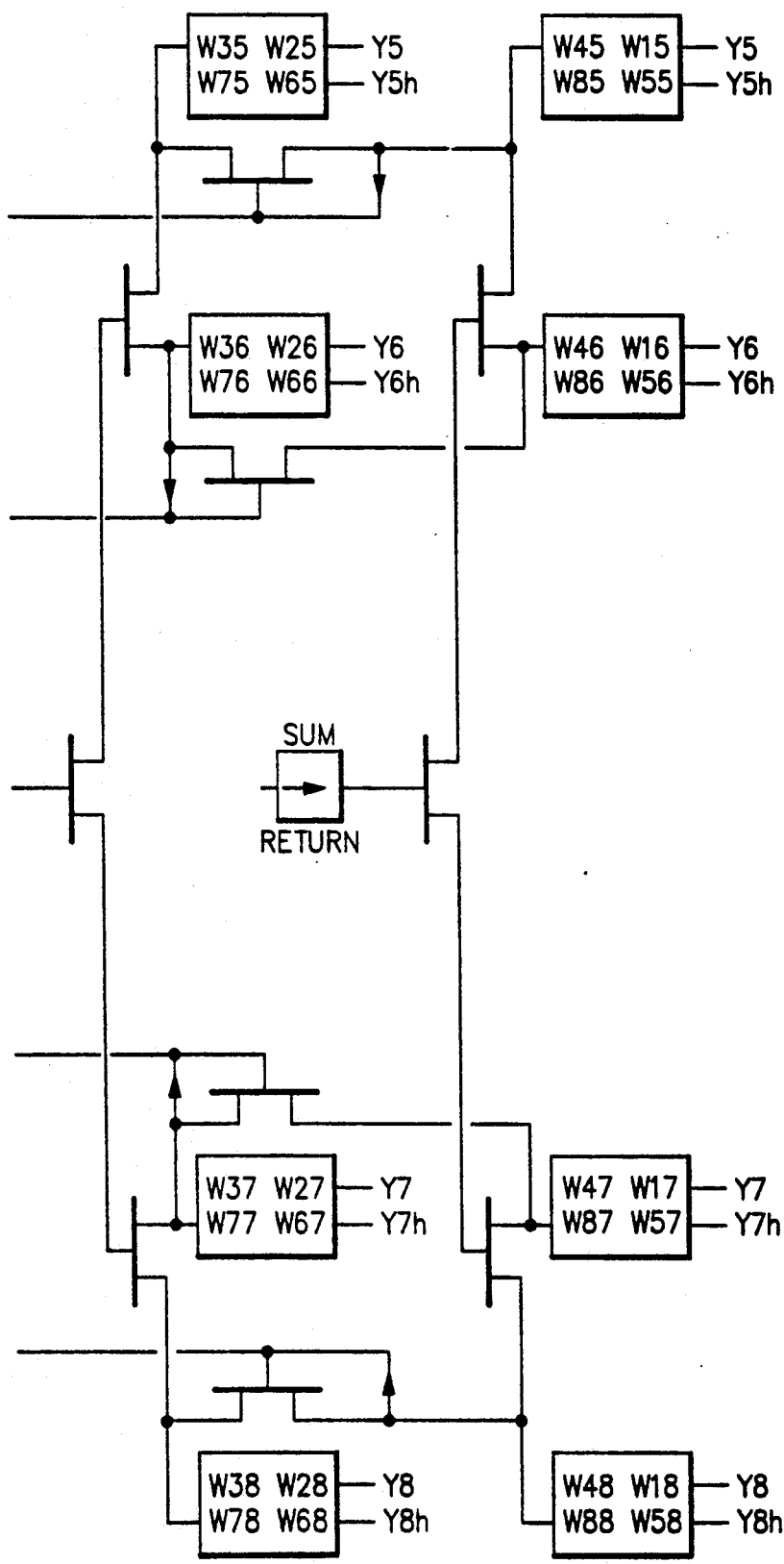
FIGS. 2, 2A, and 2B show a SNAP-V1 with eight Virtual Neurons.
Figure 2A:
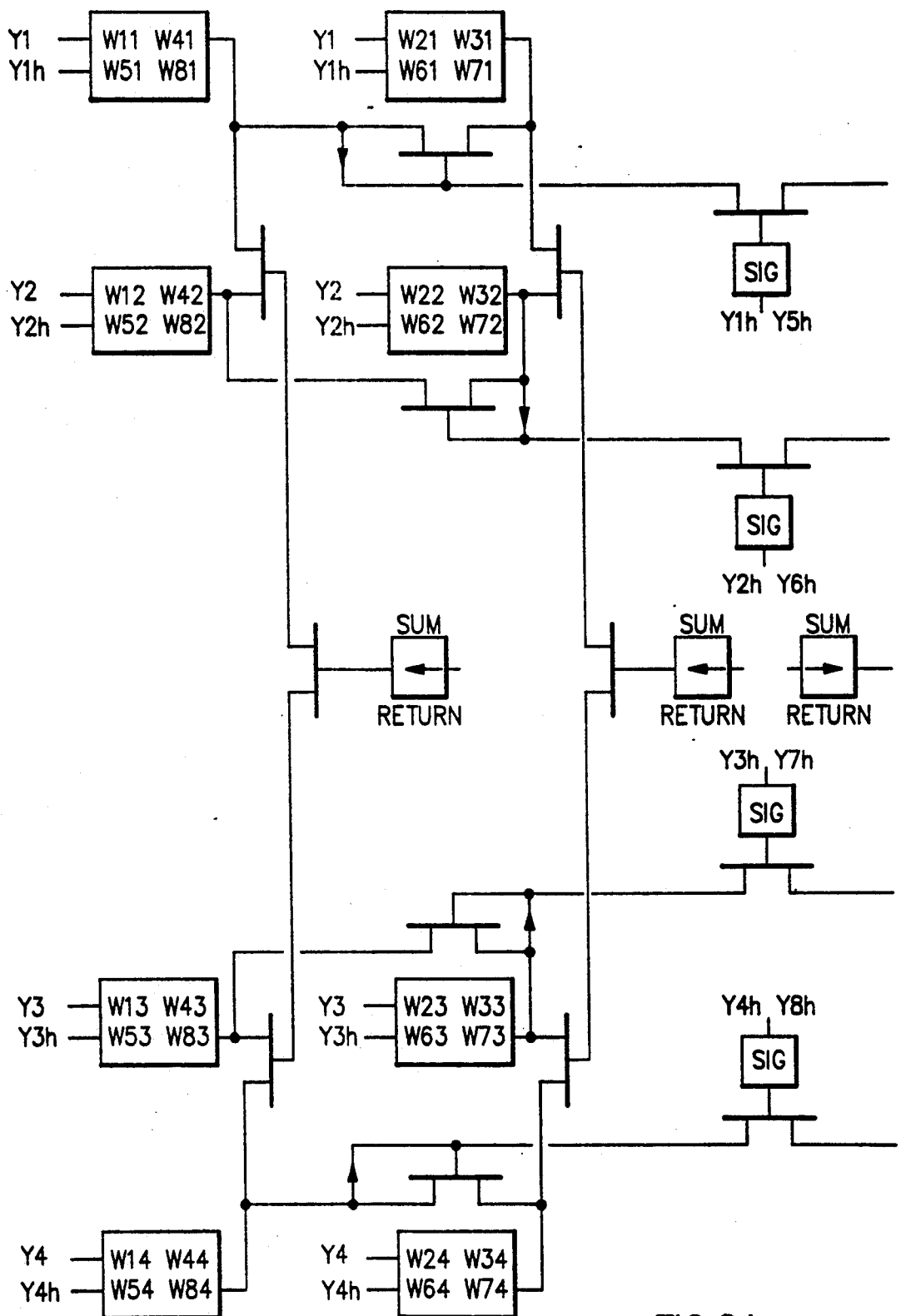

FIG. 2 shows a virtual eight neuron network modeled on a 4 neuron SNAP. Sufficient internal storage for the weights and Y values is assumed to be available within the multiplier cell structures.

Figure 3:
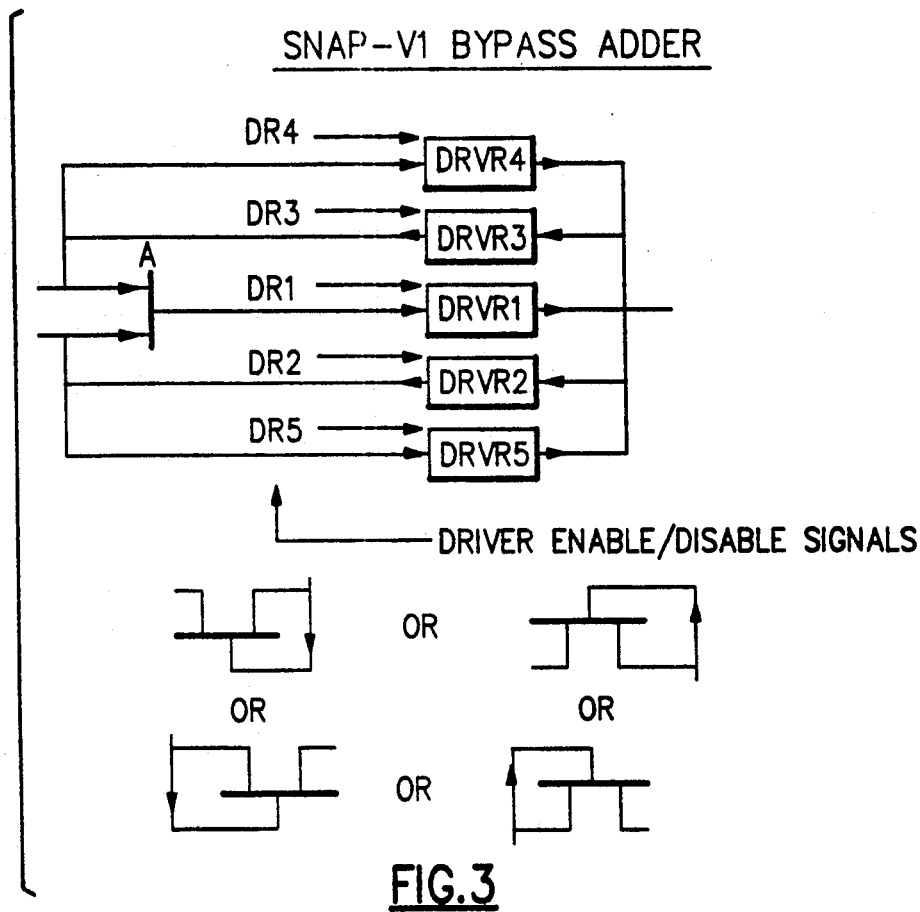
FIG. 3 illustrates a SNAP-V1 Bypass Adder.

A neuron in SNAP-V1 with V=2N utilizes 2 columns of physical neurons to represent one of the V neurons in the modeled network. In order to accomplish the full summation across the 2 column structures a variation of the communicating adder to be used in the adder tree is required. This variation, shown in FIG. 3 SNAP-V1 Bypass Adder, allows the adder to be bypassed in a forward direction as well as the reverse communication mode direction. The various bypass paths are indicated by an arrow in FIG. 3, and this symbology is also utilized in FIG. 2 to indicate where the bypass adders are used.

Table 1 depicts the driver controls, DR1, DR2, DR3, DR4, and DR5, which are driven from a central common tree controller point, encoded from D3, D2, and D1 control signals.

TABLE 1
COMMON TREE CONTROLLER TRUTH TABLE

| D3 | D2 | D1 | ACTION | |
|---|---|---|---|---|
| 0 | 0 | 0 | FORWARD ADD: | ENABLE DR1 & DISABLE DR2, 3, 4, & 5 |
| 0 | 0 | 1 | REVERSE COMMO: | ENABLE DR2, DR3 & DISABLE DR1, 4, & 5 |
| 0 | 1 | 0 | REVERSE LEG1: | ENABLE DR2 & DISABLE DR1, 3, 4, & 5 |
| 0 | 1 | 1 | REVERSE LEG2: | ENABLE DR3 & DISABLE DR1, 2, 4, & 5 |
| 1 | 0 | 0 | BYPASS LEG1: | ENABLE DR5 & DISABLE DR1, 2, 3, & 4 |
| 1 | 0 | 1 | BYPASS LEG2: | ENABLE DR4 & DISABLE DR1, 2, 3, & 5 |
| 1 | 1 | 0 | DISABLE STATE: | DISABLE ALL DRIVERS DR1, 2, 3, 4, & 5 |
| 1 | 1 | 1 | NOT USED | |

Figure 4:
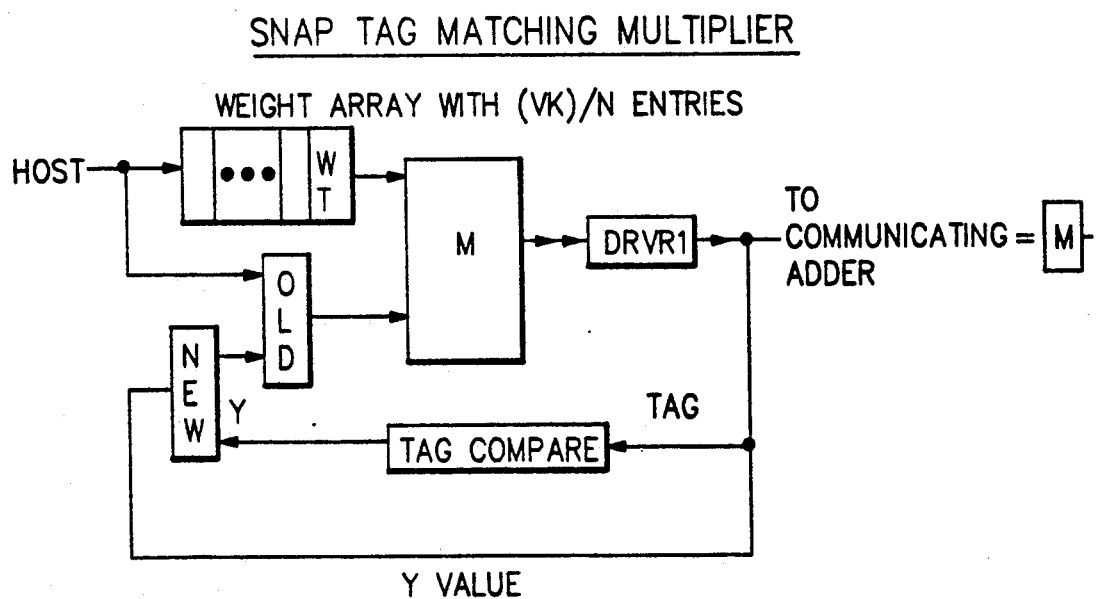
FIG. 4 illustrates a SNAP tag matching multiplier.

In order to ensure the neuron values are reverse communicated to the proper neuron input, the sigmoid generators must also tag the generated value. This tag accompanies the neuron value in its return path through the adder trees. The multiplier cell Y value input register will then require a neuron Y value tag matching compare function. This is depicted in FIG. 4 where the loading of the Y value register is under control of the tag matching function. Two Y value registers are required, an old value and a new value.

Figure 5B:
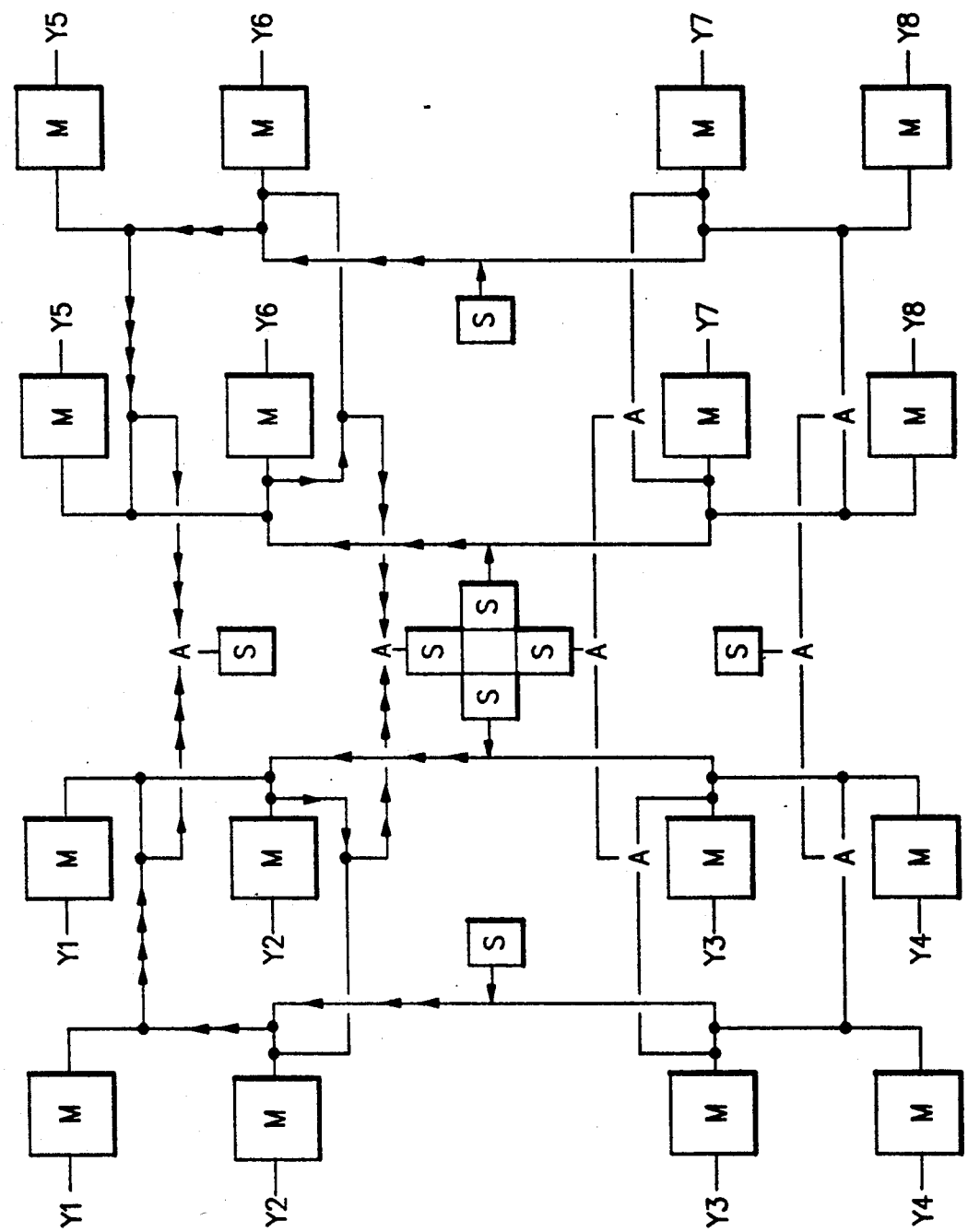
Figure 5C:
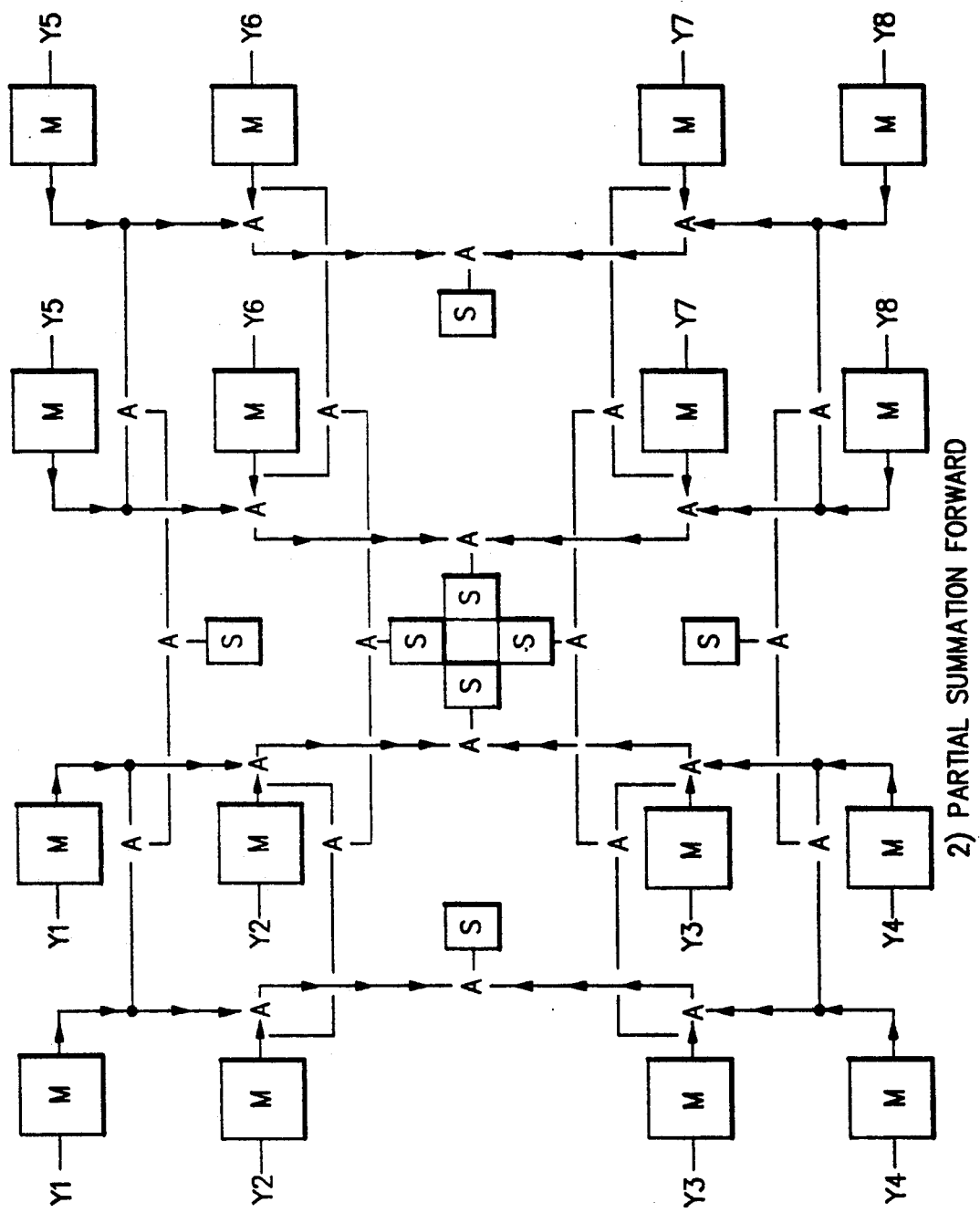
Figure 5D:
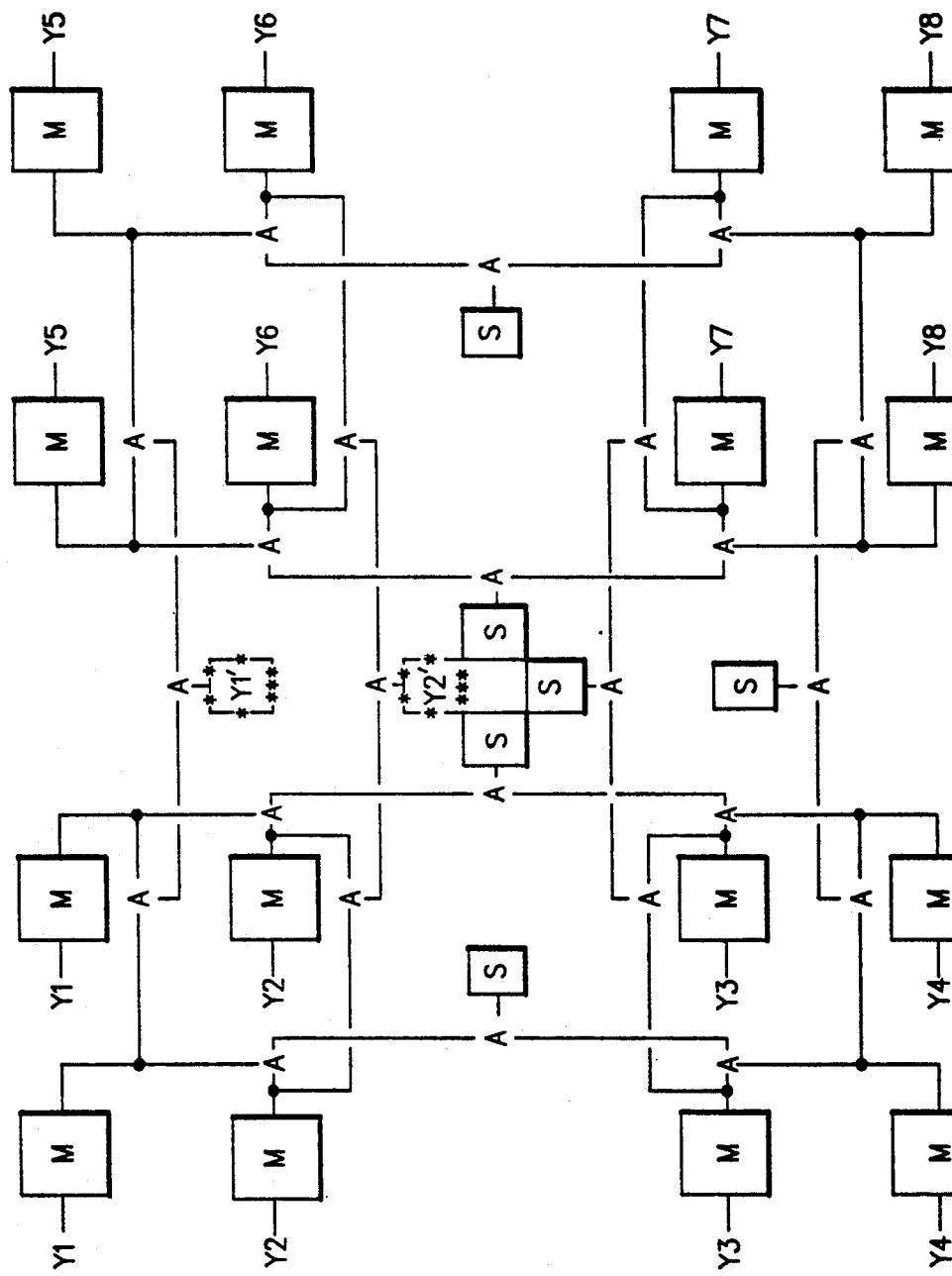
Figure 6:
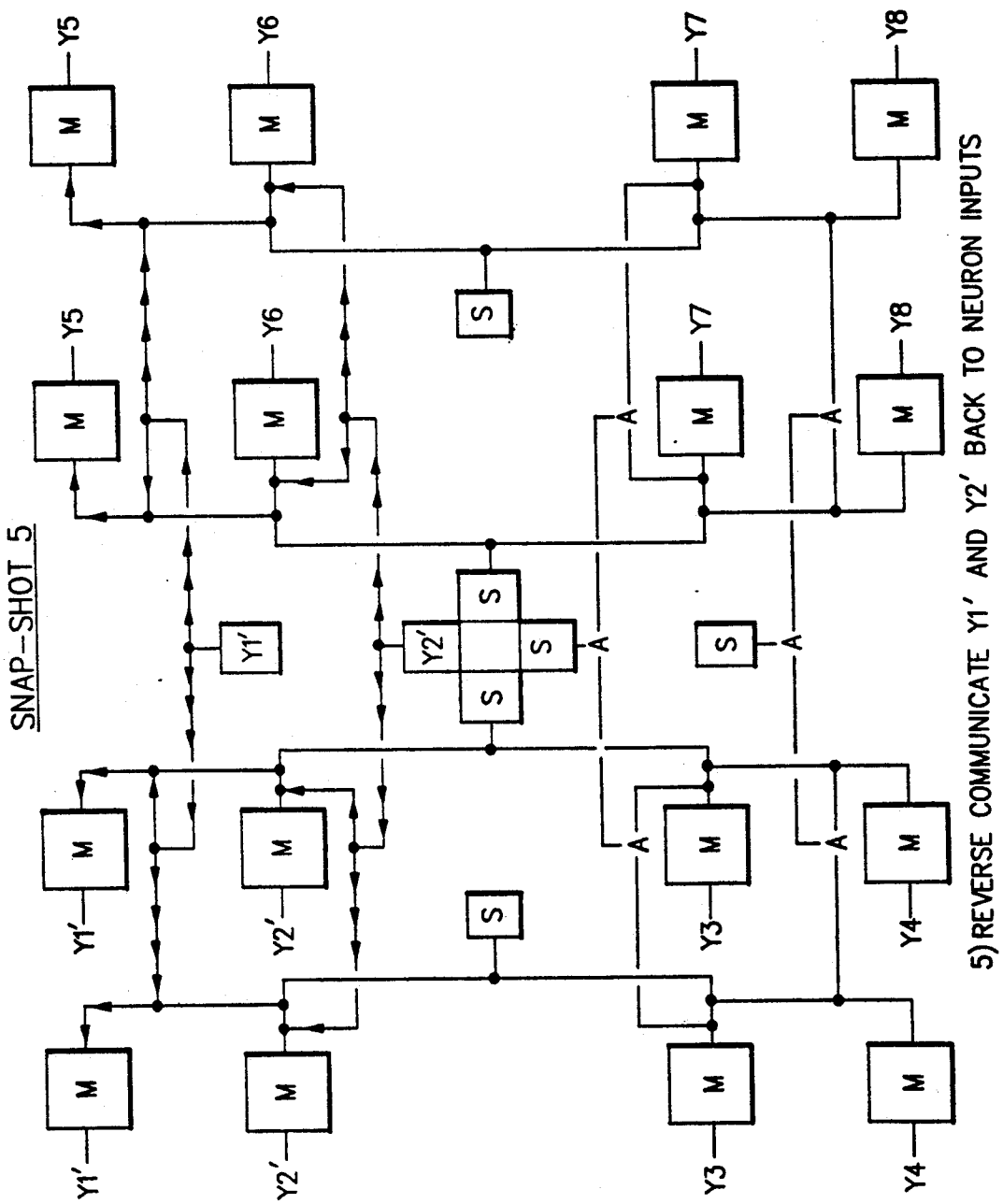
FIG. 6 shows SNAP-shot 5.
Figure 7B:
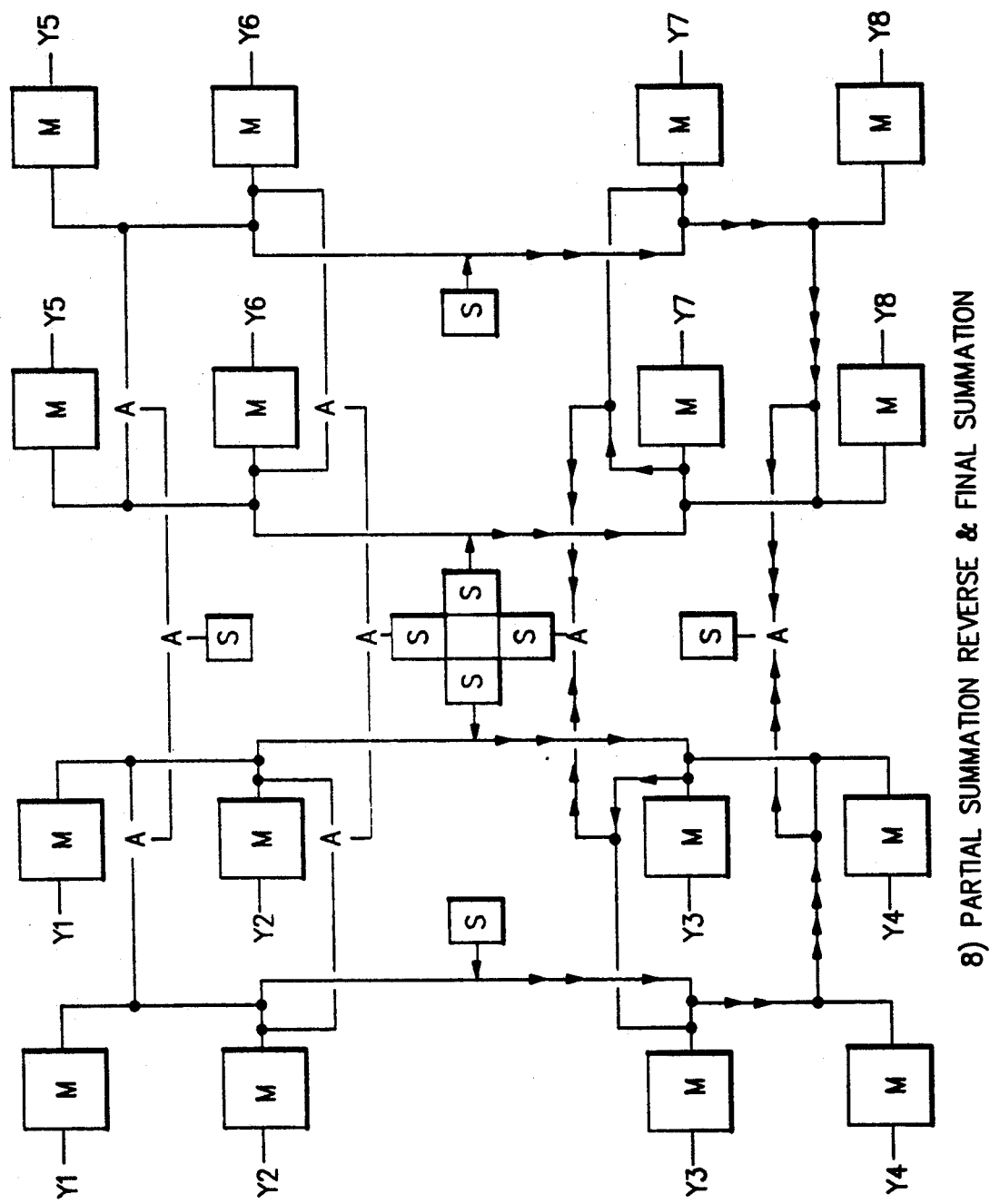
Figure 7C:
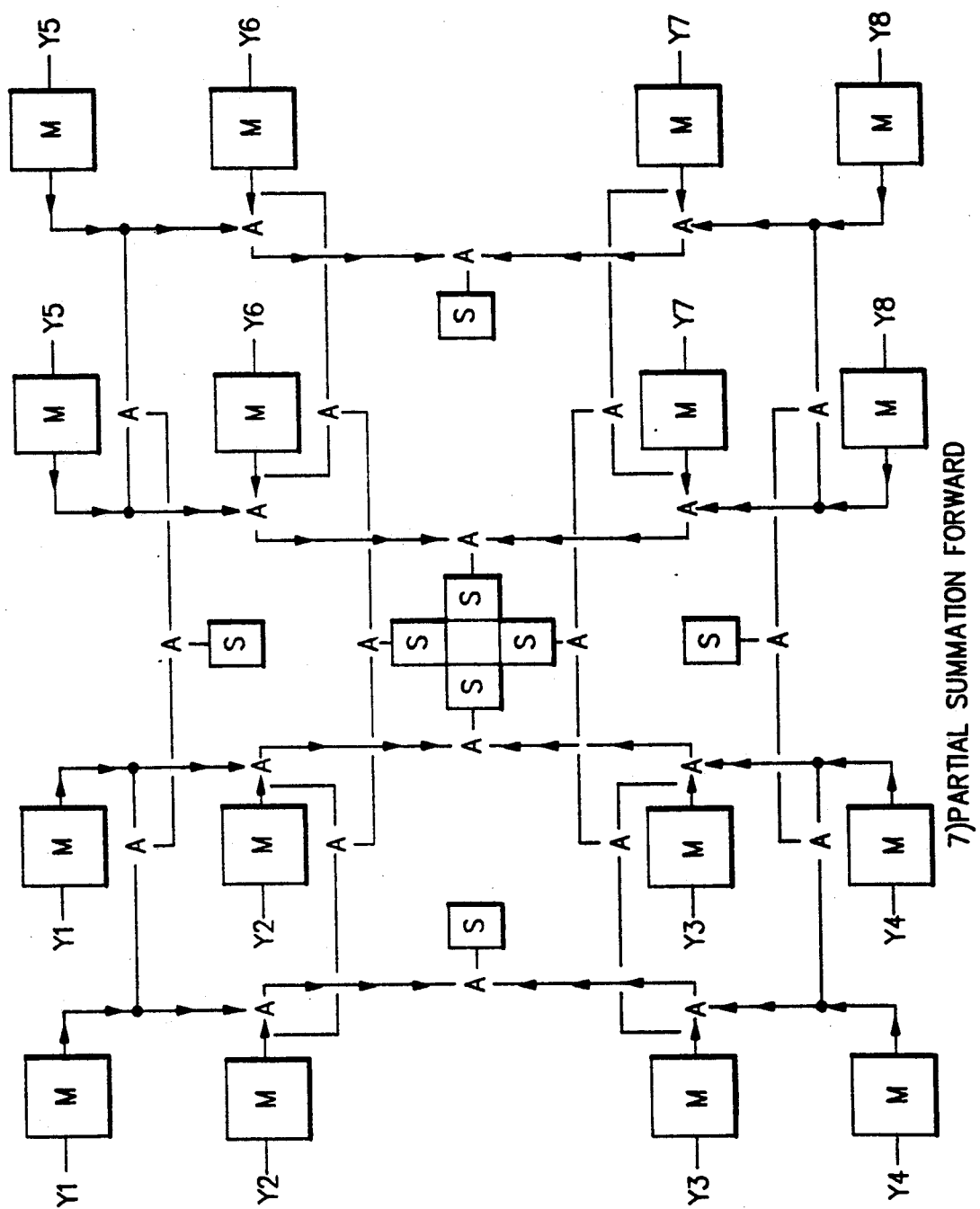
Figure 7D:
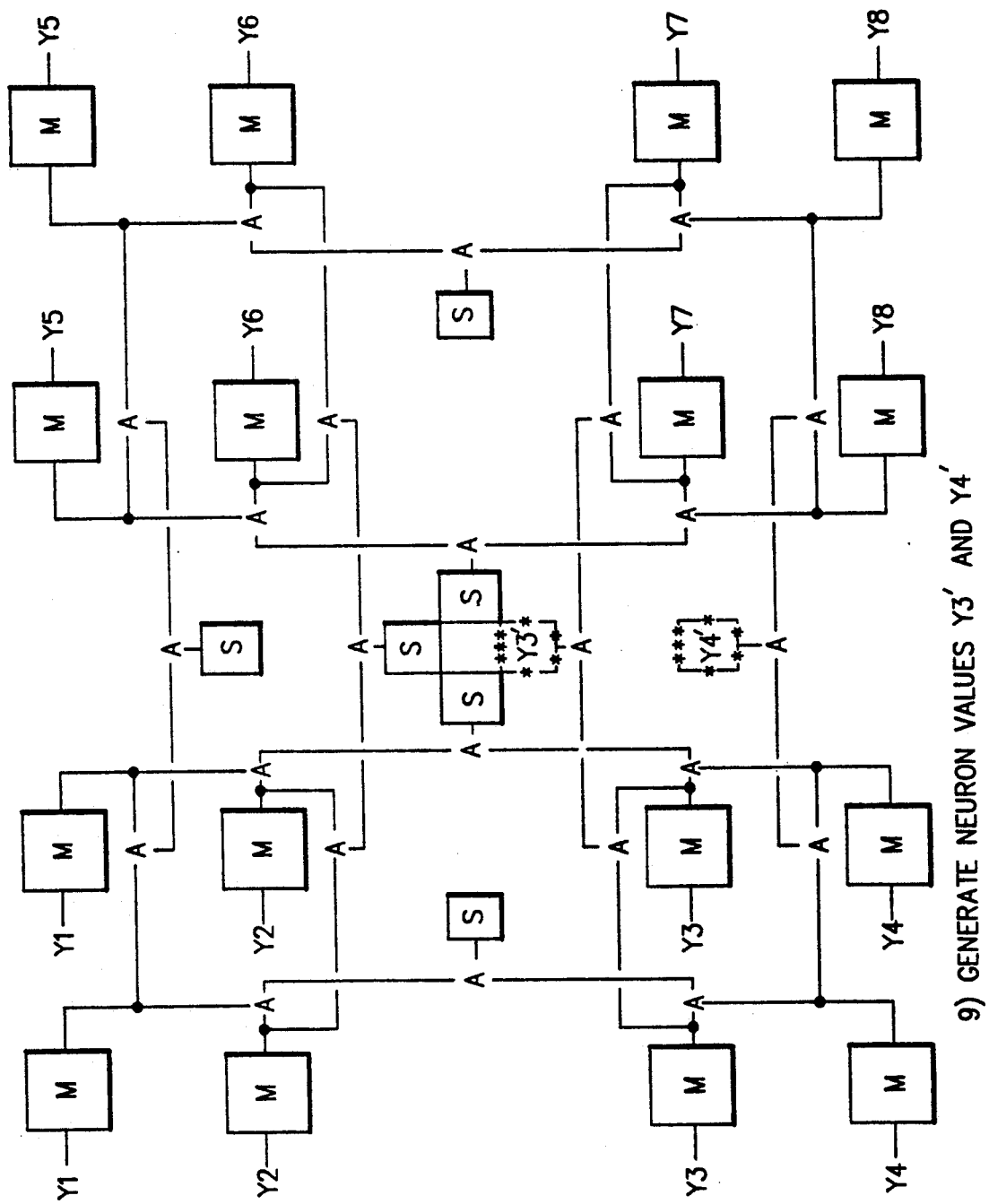
Figure 8:
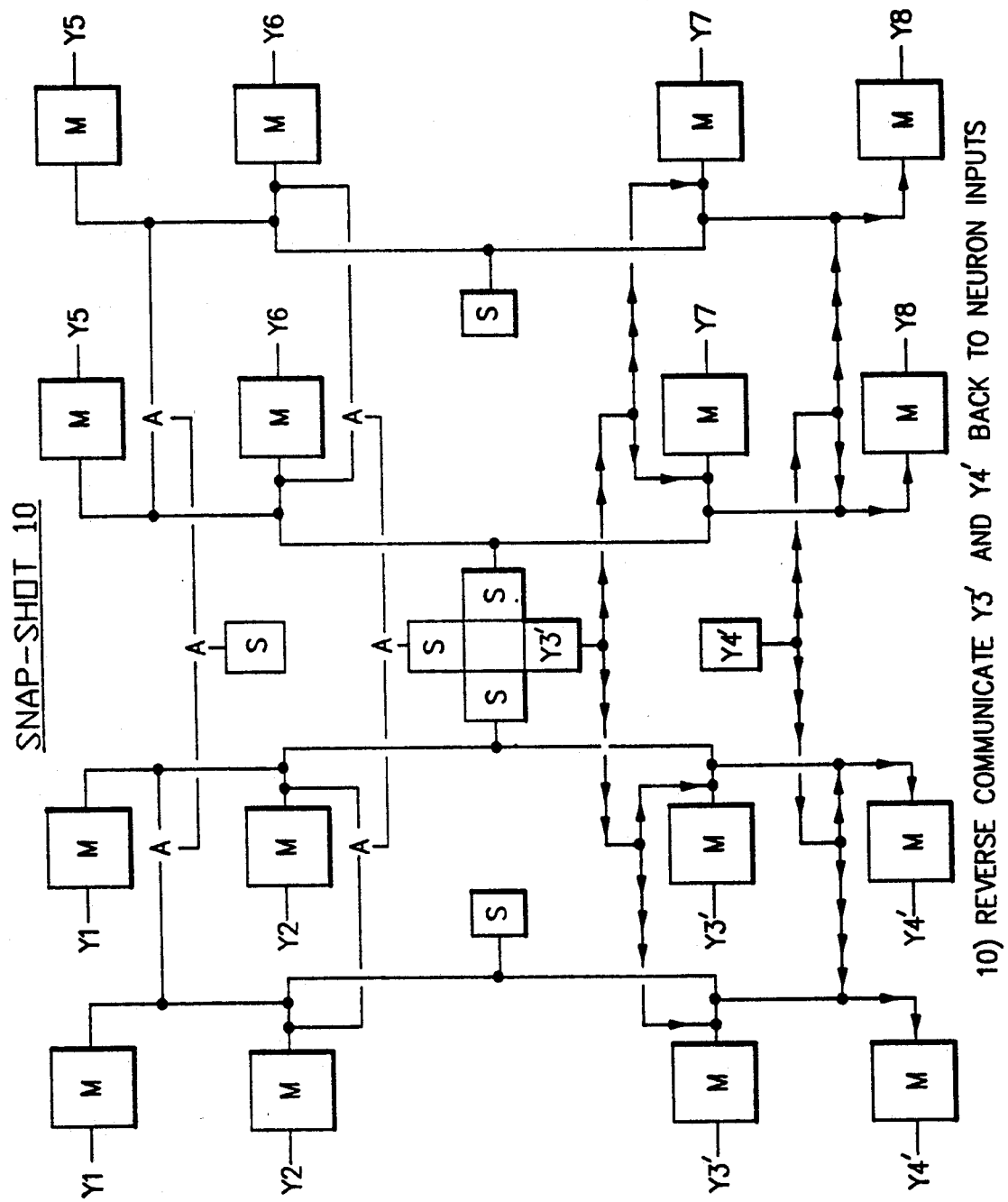
FIG. 8 shows SNAP-shot 10.

Assuming initialization has already loaded the weights, tags, and the first neuron values into the multiplier registers, the SNAP structure operates as follows: (Each numbered function corresponds to the Figures as follows: FIG. 5, SNAP-SHOTs 1-4, FIG. 6, SNAP-SHOT 5, FIG. 7, SNAP-SHOTs 6-9, and FIG. 8, SNAP-SHOT 10.)

1. MULTIPLY NEURON VALUES $Y_i$ by weights $W_{ij}$.
2. PARTIAL SUMMATION FORWARD—Operate vertical column adder trees producing the partial summation of the weighted neuron values for each column.
3. PARTIAL SUMMATION REVERSE AND FINAL SUMMATION—The partial summation is reverse communicated to the row adder trees by use of the bypass adder. Alternatively, instead of bypassing an adder, a zero can be added to the incoming partial summation if an add function is not required at that level of the row tree.
4. GENERATE NEURON VALUES $Y_1'$ AND $Y_2'$—The top two row sigmoid generators produce $Y_1'$ and $Y_2'$.
5. REVERSE COMMUNICATE $Y_1'$ AND $Y_2'$ BACK TO NEURON INPUTS—the top two row adder trees are placed into communicating mode and the two neuron values along with their tags are reverse communicated back to be received in the multiplier input registers which contain the matching tag.
6. MULTIPLY NEURON VALUES $Y_i$ by weights $W_{ij}$.
7. PARTIAL SUMMATION FORWARD—Operate vertical column adder trees producing the partial summation of the weighted neuron values for each column.
8. PARTIAL SUMMATION REVERSE AND FINAL SUMMATION—The partial summation is reverse communicated to the row adder trees by use of the bypass adder. Alternatively, instead of bypassing an adder, a zero can be added to the incoming partial summation if an add function is not required at that level of the row tree.
9. GENERATE NEURON VALUES $Y_3'$ AND $Y_4'$—The bottom two row sigmoid generators produce $Y_1'$ and $Y_2'$.
10. REVERSE COMMUNICATE $Y_3'$ AND $Y_4'$ BACK TO NEURON INPUTS—the bottom two row adder trees are placed into communicating mode and the two neuron values along with their tags are reverse communicated back to be received in the multiplier input registers which contain the matching tag.
11. Continue in the same manner for $Y_5'$, and $Y_6'$ generated from the top two row sigmoid generators and $Y_7'$ and $Y_8'$ generated from the bottom two sigmoid generators.
12. Continue until HOST specified number of iterations has been completed.

The sharing of multiple columns (rows) can be extended up to $V=N^2$ at which point all multipliers provide the weight times neuron value function for one neuron at a time. In this situation only one sigmoid generator is used per neuron update cycle. The reverse communication path is controlled to allow each tagged neuron value to reach all multiplier cells where the tag matching operation will take place. In this manner one network update cycle would take V SNAP cycles at a one neuron per cycle pace. Weight storage at each multiplier cell would increase accordingly up to $N^2$ weights per cell for a virtual network of $V=N^2$ neurons. The Y value storage would remain the same 2 values per cell, a present and a new value. In an all virtual implemention, the horizontal sigmoid generators can be removed as they would only be required in a direct simulation.

For $V=K*N$ the weight storage per multiplier cell is given as:

$$\text{Number of weights per multiplier cell} = \frac{(VK)}{N}$$

$$\text{SNAP-V1 period} = \frac{(VK)}{N}(\delta_M + 4(\log_2 N)C + \delta_S) \quad (2)$$

SNAP-V2: SNAP VIRTUAL ARCHITECTURE 2

Figure 9C:
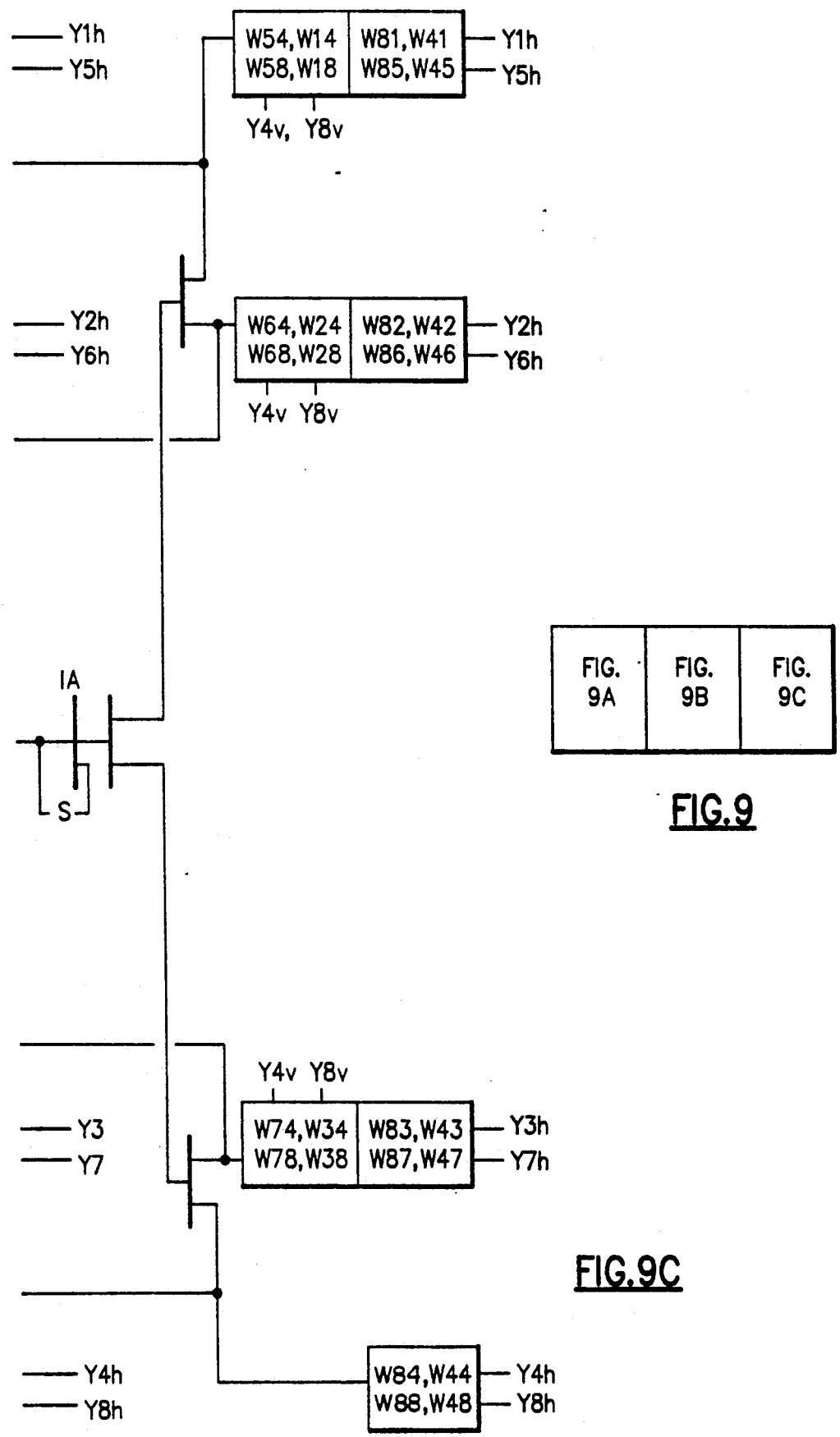
Figure 9A:
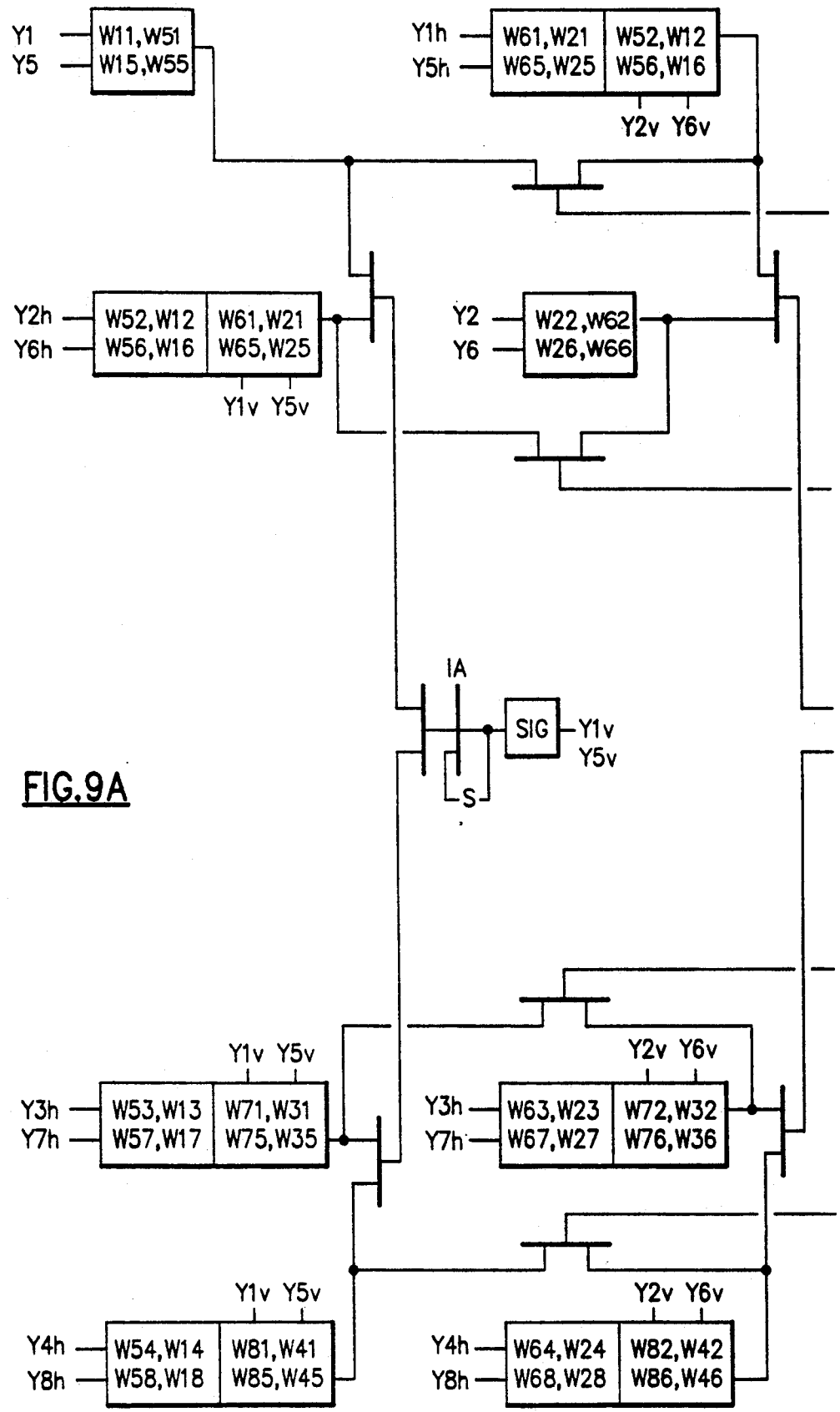
Figure 9B:
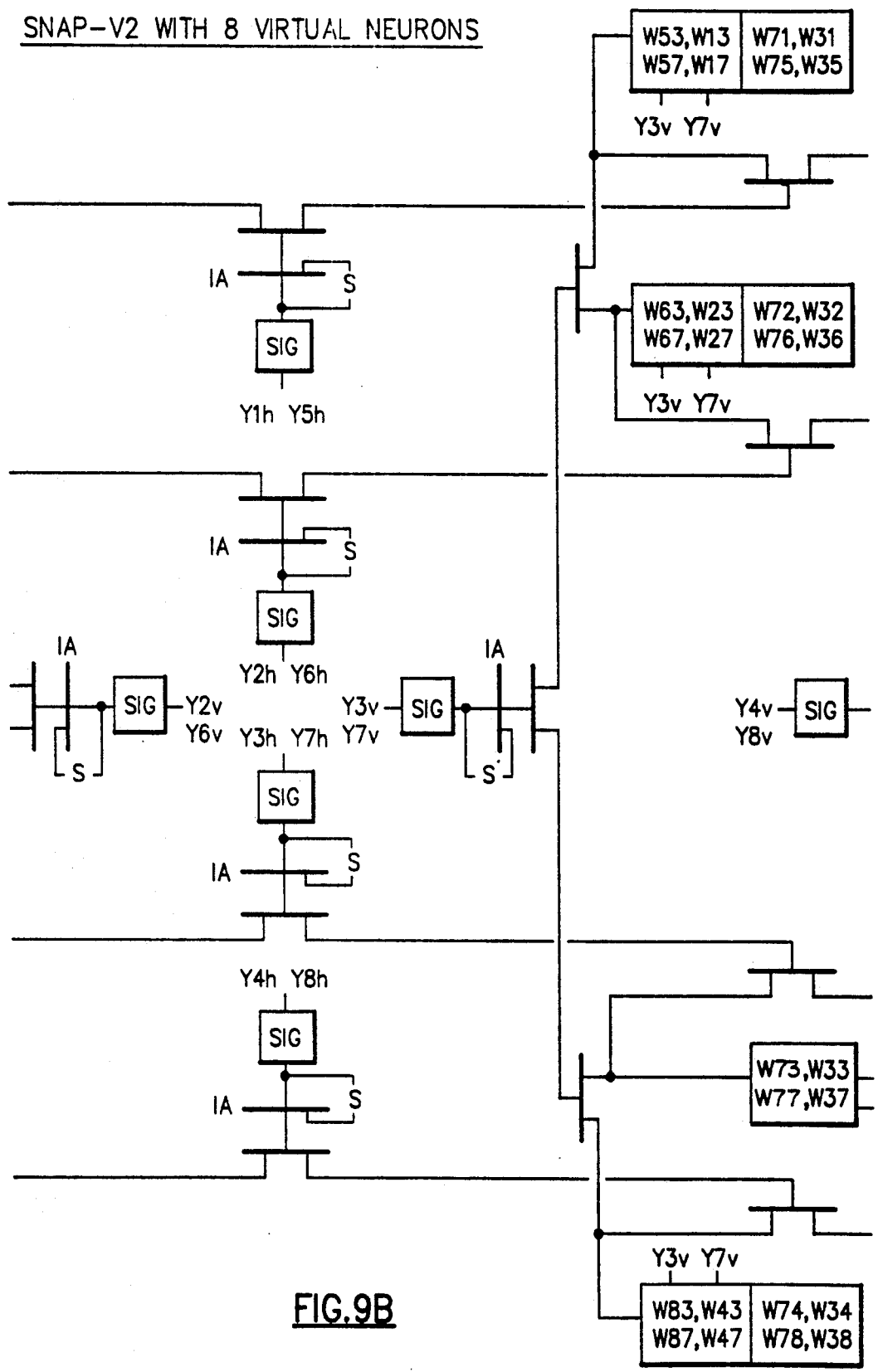

Another approach to virtual processing on SNAP discussed above is to provide an iterative adder, an adder with a storage element, at each sigmoid input. Where $V=2N$, then two cycles of each neuron are required to form the full summation prior to the sigmoid function. If $V=K*N$, then K cycles would be required to develop the full summation. This structure is shown in FIG. 9, SNAP-V2, and should be considered as an alternative embodiment.

For SNAP-V2 the following relationships hold for determining the number of weight and neuron value registers.

$$K = \Gamma\left(\frac{V}{N}\right)$$

(Where $\Gamma$ is the ceiling operator producing the next largest integer of (V/N) if fractional.)

The total number of weight registers in terms of K is:

Total Number of Weight Registers $= (2N-1)NK^2$ (Made up of $K^2$ weights in the diagonal cells and $2K^2$ weights in the other cells.)

There are K Y value registers in the diagonal cells and 2K Y value registers in the other cells.

SNAP-V2
$$\text{period} = K(K\delta_M + (K+1)(\log_2 N)C + \delta_{IA} + \delta_S) \quad (4)$$

TSNAP-V1: TSNAP VIRTUAL ARCHITECTURE 1

Figures 10, 11:
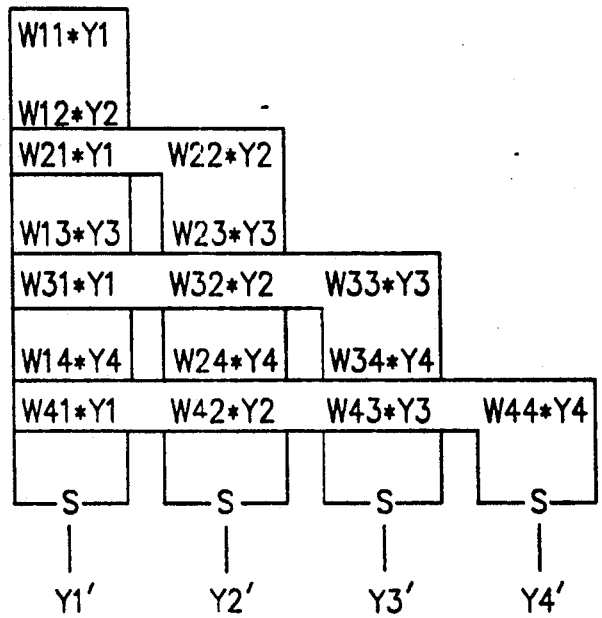
FIG. 10 illustrates a four Neuron T-SNAP.
FIG. 11 shows an 9-Neuron T-SNAP weight matrix with Neuron Y values.

A virtual implementation on the TSNAP is our normally preferred embodiment, implementing the functions achieved by T-SNAP. This will be demonstrated utilizing a 4, 8, and a 16 neuron network modeled on a 4 neuron TSNAP. FIG. 10 depicts the 4 neuron T-SNAP. For example in FIG. 10, Neuron 3, producing $Y_3$ is represented by the outline of the N=4 product terms that are highlighted in a bold font. In this TSNAP-V1 section the function F for all equations is assumed to be the sigmoid function. The equation for Neuron 3 is printed here for easy reference with FIG. 10.

$$Y_3 = F(W_{31}Y_1 + W_{32}Y_2 + W_{33}Y_3 + W_{34}Y_4)$$

In FIGS. 10, 12, and 14–17, S represents the sigmoid generators.

FIG. 11 represents the 8 neuron weights and Y values required when modeled on an 8 neuron TSNAP. FIG. 12 modifies the TSNAP structure of FIG. 10 by replicating the diagonal cells, G-Cells, and addition trees and producing the partial summation on the diagonal of the structure. The summation is shown on the diagonal to demonstrate that the summation tree structure can be placed as required. The triangular sections replicated exclude the sigmoid generator through the size of the section is based on the number of sigmoid generators which is equal to the number of physical neurons N of the TSNAP section. For TSNAP-V1 it will be assumed that the triangular sections are replicated enough times to handle the largest network to be modeled on the system. The number of replicated triangular sections is given by:

$$K = \Gamma\left(\frac{V}{N}\right)$$

(Where $\Gamma$ is the ceiling operator producing the next largest integer of (V/N) if fractional.)

In the example of FIG. 12, STEP 1, the weights and output values for neurons 1 to 4 are depicted first for clarity. FIG. 12 STEP 2 shows the weights and structure required for neurons 5 to 8. For example, in FIG. 12, Neuron 3, producing $Y_3$ and Neuron 7, producing $Y_7$, are represented by the outline of the N=8 product terms that are highlighted in a bold font in STEP 1 and STEP 2. The equations for Neuron 3 and 7 are printed here for easy reference with FIG. 12.

$$Y_3 = F(W_{31}Y_1 + W_{32}Y_2 + W_{33}Y_3 + W_{34}Y_4 + W_{35}Y_5 + W_{36}Y_6 + w_{37}Y_7 + w_{38}Y_8)$$

$$Y_7 = F(W_{71}Y_1 + W_{72}Y_2 + W_{73}Y_3 + W_{74}Y_4 + W_{75}Y_5 + W_{76}Y_6 + w_{77}Y_7 + w_{78}Y_8)$$

For the reverse communications path, the neuron values would be tagged such that only the correct neuron values are loaded into the proper triangular section. The compare of the tag can be done prior to sending the neuron value into a triangular section or at each Y value storage register.

Figures 13, 13C:
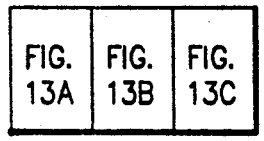
Figure 14:
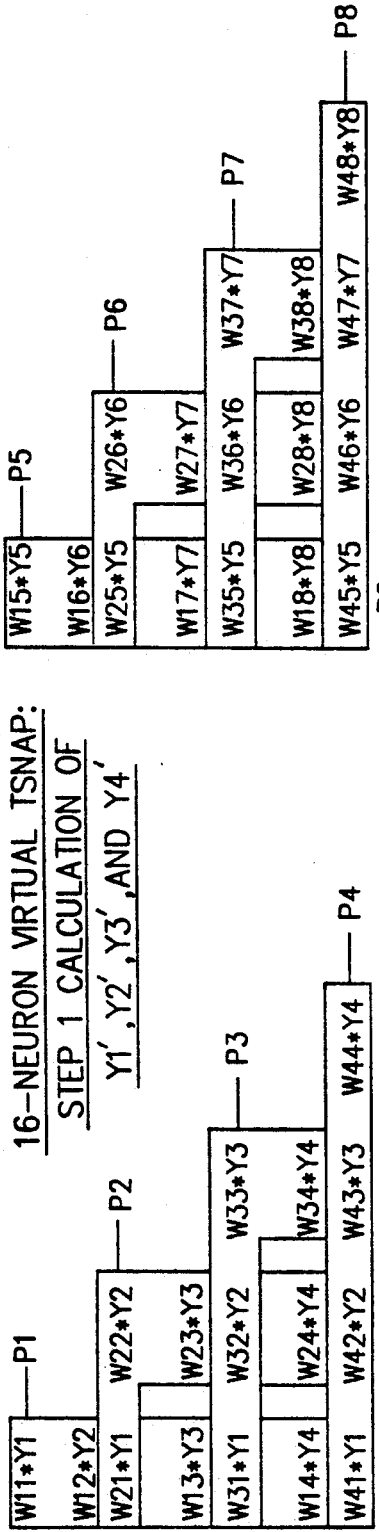
FIG. 14 shows a 16-Neuron Virtual T-SNAP, and the Step 1 calculation of Y1', Y2', Y3', and Y4'.
Figure 16:
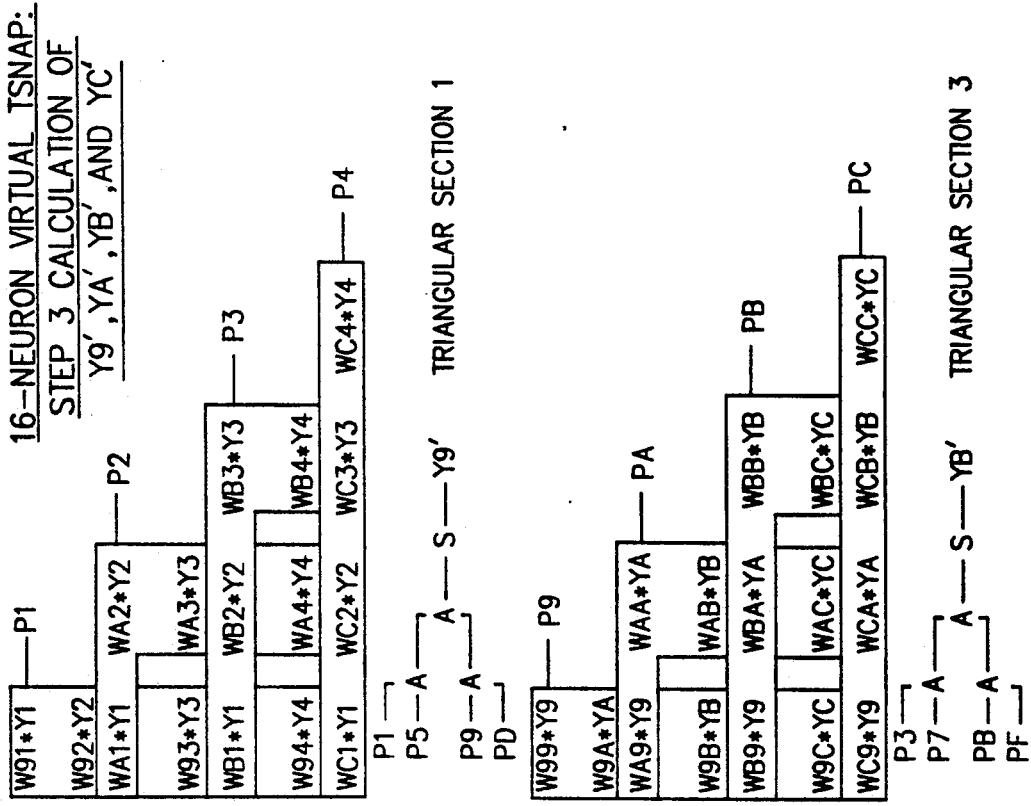
FIG. 16 shows a 16-Neuron Virtual T-SNAP, and the Step 3 calculation of Y9', YA', YB', and YC'.
Figure 17:
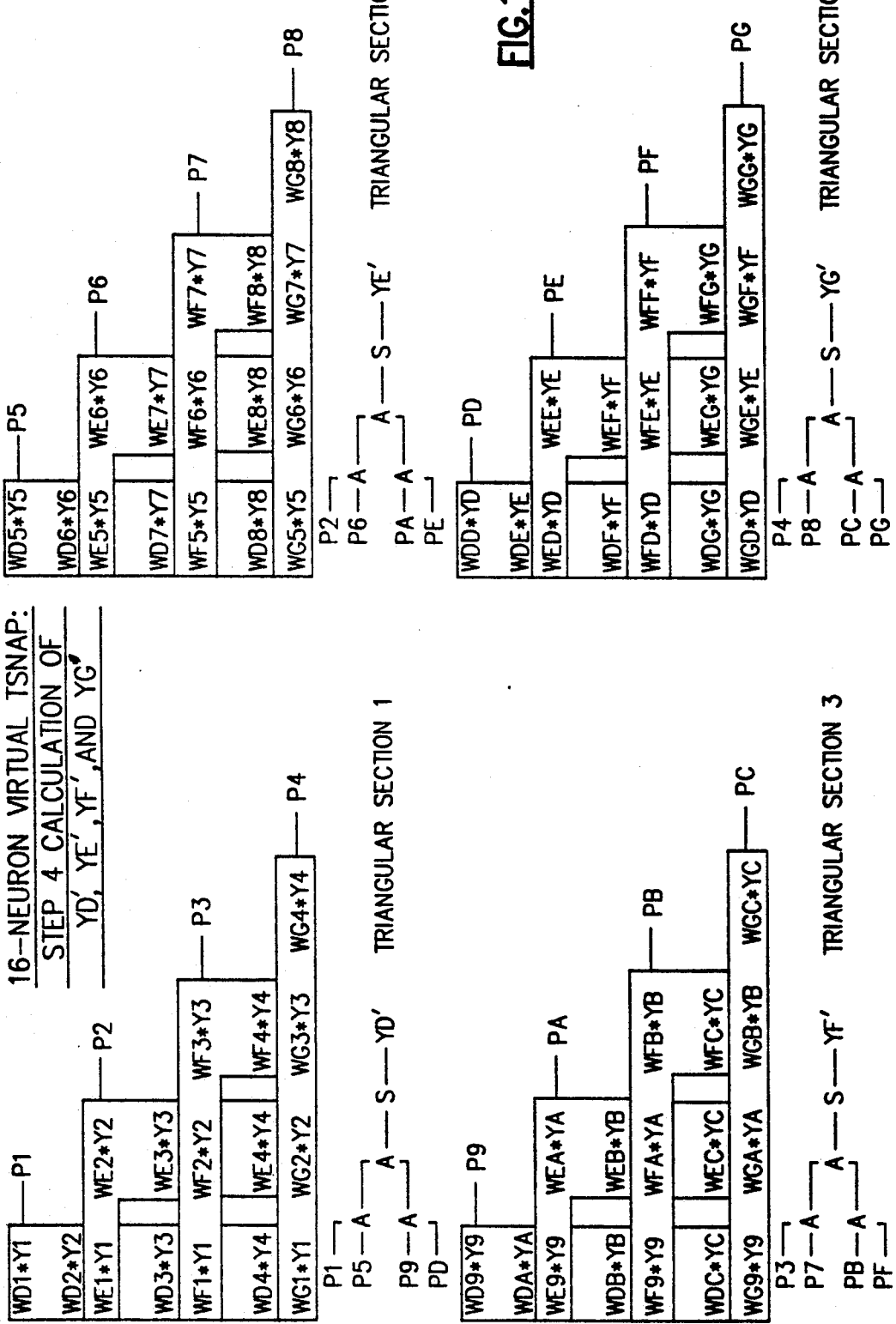
FIG. 17 shows a 16-Neuron Virtual TSNAP, with four triangular sections and a Step 4 calculation of UD', YE', YF' and YG'.

One of the advantages of these illustrated embodiments which we prefer is that the basic concept shown in FIG. 12 can be continue for larger networks by replication of the multipliers and communicating adder trees while keeping the same number of neuron activation function generators. This approach for a 16 neuron network is shown in FIG. 14, 15, 16, and 17. For reference all the weights and neuron values for the 16 neurons, as would be used in a 16 neuron T-SNAP, are shown in FIG. 13. FIGS. 14, 15, 16, and 17 contain 4 replicated T-SNAP sections. The weights and output values for neurons 1 to 4 are depicted in FIG. 14 STEP 1. FIG. 15 STEP 2 shows the weights and structure required for neurons 5 to 8. Similarly, FIG. 16 STEP 3 shows neurons 9 to 12 and FIG. 17 STEP 4 shows neurons 13 to 16. For clarity A=10, B=11, C=12, D=13, E=14, F=15, and G=16. For example in FIGS. 14, 15, 16, and 17, Neuron 3, producing $Y_3$, Neuron 7, producing $Y_7$, Neuron 12, producing $Y_{12}$, and Neuron 14, producing $Y_{14}$ are represented by the outlines of the N=16 product terms for each neuron value, that are highlighted in a bold font in STEP 1 through STEP 4. The equations for Neurons 3, 7, 12, and 14 are printed here for easy reference with FIGS. 14, 15, 16, and 17.

$$Y_3 = F(W_{3,1}Y_1 + W_{3,2}Y_2 + W_{3,3}Y_3 + W_{3,4}Y_4 + W_{3,5}Y_5 + W_{3,6}Y_6 + w_{3,7}Y_7 + W_{3,8}Y_8) + (W_{3,9}Y_9 + W_{3,10}Y_{10} + W_{3,11}Y_{11} + W_{3,12}Y_{12} + W_{3,13}Y_{13} + W_{3,14}Y_{14} + W_{3,15}Y_{15} + W_{3,16}Y_{16})$$

$$Y_7 = F(W_{7,1}Y_1 + W_{7,2}Y_2 + W_{7,3}Y_3 + W_{7,4}Y_4 + W_{7,5}Y_5 + W_{7,6}Y_6 + w_{7,7}Y_7 + W_{7,8}Y_8) + (W_{7,9}Y_9 + W_{7,10}Y_{10} + W_{7,11}Y_{11} + W_{7,12}Y_{12} + W_{7,13}Y_{13} + W_{7,14}Y_{14} + W_{7,15}Y_{15} + W_{7,16}Y_{16})$$

$$Y_{12} = F(W_{12,1}Y_1 + W_{12,2}Y_2 + W_{12,3}Y_3 + W_{12,4}Y_4 + W_{12,5}Y_5 + W_{12,6}Y_6 + w_{12,7}Y_7 + W_{12,8}Y_8) + (W_{12,9}Y_9 + W_{12,10}Y_{10} + W_{12,11}Y_{11} + W_{12,12}Y_{12} + W_{12,13}Y_{13} + W_{12,14}Y_{14} + W_{12,15}Y_{15} + W_{12,16}Y_{16})$$

$$Y_{14} = F(W_{14,1}Y_1 + W_{14,2}Y_2 + W_{14,3}Y_3 + W_{14,4}Y_4 + W_{14,5}Y_5 + W_{14,6}Y_6 + w_{14,7}Y_7 + W_{14,8}Y_8) + (W_{14,9}Y_9 + W_{14,10}Y_{10} + W_{14,11}Y_{11} + W_{14,12}Y_{12} + W_{14,13}Y_{13} + W_{14,14}Y_{14} + W_{14,15}Y_{15} + W_{14,16}Y_{16})$$

In FIGS. 14, 15, 16, and 17, S represents the sigmoid generators.

The following are the implementation costs:
K weight registers per multiplier cell
1 Y value register per multiplier cell
$KN^2$ multipliers total
K N (N−1) adders total
The TSNAP-V1 performance is:

TSNAP-V1
period = $K(\delta_M + 2(\log_2 N + \log_2 K)\delta_A + \delta_S)$

TSNAP-V2: TSNAP VIRTUAL ARCHITECTURE 2

Figures 18, 18B:
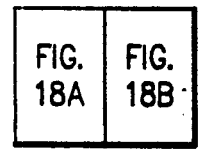

Another approach for developing a virtual TSNAP, without the replication of the multiplier and communicating adder sections, is by including the weights and neuron values in the cells and by sharing the multipliers and adder trees in a cyclic fashion. In order to accomplish this an iterative adder would be required prior to the activation function input to store the partial sums and to add the partial sums each cycle. This structure on a four physical neuron TSNAP is shown in FIG. 18 along with the weight and neuron value storage required for a 16 neuron virtual network.

The following are the implementation costs:
K*K weight registers per multiplier cell
K Y value register per multiplier cell
$N^2$ multipliers total
N (N−1)+N (IA) adders total
The TSNAP-V2 performance is:

TSNAP-V2
period = $K(K\delta_M + 2(\log_2 N \delta_A + \delta_{IA}) + \delta_S)$

SUMMARY TABLE USED FOR CHOOSING THE EMBODIMENT TO BE USED

FIG. 19 shows a hardware cost and performance comparison between the four different SNAP virtual processor designs. Assume that both V and N are powers of 2. Assume that only all virtual implementation are considered and that K=V/N. Accordingly, it will be seen that the various embodiments which we prefer are generally useful in different instances and that choice will depend upon application, cost and performance comparisons for the desired application.

While we have described our preferred embodiments of our inventions, it will be understood that those skilled in the art, both now and in the future, upon the understanding of these discussions will make various improvements and enhancements thereto which fall within the scope of the claims which follow. These claims should be construed to maintain the proper protection for the inventions first disclosed.

What is claimed is:

1. A virtual scalable neural array processor apparatus comprising:
    an N neuron structure, where N is an integer greater than one, said N neuron structure having:
    weight multiplication units including a multiplier, weight storage, and neuron output value storage for V neurons, where V is an integer greater than N and is the number of neurons in a neural network to be emulated on the N neuron structure,
    communicating adder trees, and
    neuron activation function units; and
    means for communicating outputs of the neuron activation function units back to the weight multiplication units through the communicating adder trees.

2. The apparatus according to claim 1 wherein the apparatus contains:
    $N^2$ weight multiplication units, each said multiplication unit including weight storage units, neuron output storage units, a multiplier, and means for tag matching,
    orthogonal sets of 2N communicating adder trees, and 2N neuron activation function units.

3. The apparatus according to claim 1 wherein the neuron activation function units are non-linear sigmoid generators.

4. The apparatus according to claim 1 wherein the communicating adder trees contain $\log_2 N$ 2 to 1 communicating adder stages.

5. The apparatus according to claim 4 wherein each stage in the communicating adder trees contains 2 to 1 communicating adders comprising:
    a 2 to 1 adder,
    an adder bypass path communicating values in a reverse direction than that used by an addition path,
    adder bypass paths communicating values in the same direction as the addition path, and
    means for switching between the addition path and different communication paths.

6. The apparatus according to claim 2 wherein each said weight multiplication unit contains:
    $K^2$ weight storage units, where K is equal to V/N and V, a power of 2, is the number of neurons in the neural network to be emulated on the N neutron structure, and
    two neuron output storage units.

7. The apparatus according to claim 6 wherein the means for tag matching ensures that only neuron output values with tags that match a weight processing unit's tags are stored in the neuron output storage units.

8. The apparatus according to claim 6 wherein the two neuron output storage units are made up of an old neuron output value storage unit and a new neuron output value storage unit.

9. The apparatus according to claim 2 further comprising 2N accumulating adders, each containing a partial summation storage unit, connected between the 2N communicating adder trees and the weight multiplication units.

10. The apparatus according to claim 9 wherein the communicating adder trees contain $\log_2 N$ 2 to 1 communicating adder stages.

11. The apparatus according to claim 10 wherein each stage in the communicating adder tree contains 2 to 1 communicating adders comprising:
    a 2 to 1 adder,
    an adder bypass path for communicating values in a reverse direction than that used by an addition path, and
    means for switching between the addition path and a reverse communication path.

12. The apparatus according to claim 9 wherein:
    N diagonal weight multiplication units contain;
        a multiplier and $K^2$ weight storage units, and K neuron output storage units, and
    $N^2-N$ weight multiplication units contain;
        $2K^2$ weight storage units, and 2K neuron output storage units,
    where K is equal to V/N and both V and N are a power of 2.

13. The apparatus according to claim 1 wherein the apparatus contains $N^2$ weight multiplication units in the form of a N by N weight matrix folded along a diagonal and each weight multiplication unit comprises:
   K weight storage units where K is equal to V/N,
   one neuron output storage unit,
   a multiplier, and
   means for tag matching,
and is herein termed a triangular section.

14. The apparatus according to claim 13 wherein the means for tag matching ensures that only neuron output values with tags that match a weight multiplication unit's tags are stored in the neuron output storage unit.

15. The apparatus according to claim 13 wherein a V neuron structure comprises V/N triangular sections each with N communicating adder trees containing;
   $\log_2 N$ 2 to 1 communicating adder stages, and external to the triangular sections N external communicating adder trees containing;
      $\log_2(V/N)$ communicating adder stages, and N neuron activation function units.

16. The apparatus according to claim 15 wherein each stage in the communicating adder trees contain 2 to 1 communicating adders comprising;
   a 2 to 1 adder,
   an adder bypass path for communicating values in a reverse direction than that used by an addition path, and
   means for switching between the addition path and a reverse communication path.

17. The apparatus according to claim 1 wherein the apparatus contains;
   $N^2$ weight multiplication units in the form of a N by N matrix folded along a diagonal and each weight multiplication unit comprises $K^2$ weight storage units, where K is equal to V/N, K neuron output storage units, and one multiplier, and
   N communicating adder trees,
   N accumulating adders, each containing a partial summation storage unit, connected between the N communicating adder trees and the weight multiplication units, and
   N neuron activation function units.

18. The apparatus according to claim 17 wherein the communicating adder trees include $\log_2 N$ 2 to 1 communicating adder stages, and wherein each said stage in the communicating adder tree contains 2 to 1 communicating adders comprising;
   a 2 to 1 adder,
   an adder bypass path for communicating values in a reverse direction than that used by an addition path, and
   means for switching between the addition path and a reverse communication path.

* * * * *